(12) United States Patent
Kawano

(10) Patent No.: US 10,877,555 B2
(45) Date of Patent: Dec. 29, 2020

(54) INFORMATION PROCESSING DEVICE AND INFORMATION PROCESSING METHOD FOR CONTROLLING USER IMMERSION DEGREE IN A VIRTUAL REALITY ENVIRONMENT

(71) Applicant: SONY CORPORATION, Tokyo (JP)

(72) Inventor: Shinichi Kawano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/486,963

(22) PCT Filed: Dec. 8, 2017

(86) PCT No.: PCT/JP2017/044129
§ 371 (c)(1),
(2) Date: Aug. 19, 2019

(87) PCT Pub. No.: WO2018/173383
PCT Pub. Date: Sep. 27, 2018

(65) Prior Publication Data
US 2020/0004321 A1  Jan. 2, 2020

(30) Foreign Application Priority Data
Mar. 21, 2017  (JP) ................. 2017-054197

(51) Int. Cl.
*G06F 3/01* (2006.01)
*G06F 3/16* (2006.01)
(Continued)

(52) U.S. Cl.
CPC ............ *G06F 3/011* (2013.01); *G06F 3/16* (2013.01); *G06T 13/80* (2013.01); *G09G 5/373* (2013.01);
(Continued)

(58) Field of Classification Search
CPC ....... G06T 19/006; G06T 13/80; G06F 3/048; G06F 3/16; G06F 3/011; G06F 2203/011;
(Continued)

(56) References Cited

U.S. PATENT DOCUMENTS

2010/0092155 A1   4/2010 Inagaki et al.
2014/0316192 A1*  10/2014 de Zambotti ......... A61M 21/02
                                                        600/28

(Continued)

FOREIGN PATENT DOCUMENTS

CN    101686352 A    3/2010
CN    105474302 A    4/2016
(Continued)

OTHER PUBLICATIONS

International Search Report and Written Opinion of PCT Application No. PCT/JP2017/044129, dated Feb. 27, 2018, 10 pages of ISRWO.

*Primary Examiner* — Jin Cheng Wang
(74) *Attorney, Agent, or Firm* — Chip Law Group

(57) ABSTRACT

The present disclosure proposes an information processing device, an information processing method, and a program capable of appropriately suppressing an immersion degree of a user who is using a virtual reality content. An information processing device includes: an acquisition unit that acquires excitement information regarding use of a virtual reality content or information regarding an action of a first user who is using the content; and an output control unit that performs display control for lowering an immersion degree of the first user on the basis of the excitement information or the information regarding the action of the first user during a period in which the content is displayed by a display unit.

20 Claims, 31 Drawing Sheets

(51) Int. Cl.
    *G06T 13/80*    (2011.01)
    *G09G 5/373*    (2006.01)
    *G09G 5/377*    (2006.01)
    *G09G 5/38*     (2006.01)
    *G10L 15/22*    (2006.01)
    *G10L 15/26*    (2006.01)
    *G02B 27/01*    (2006.01)
    *G06F 3/048*    (2013.01)
    *G06T 19/00*    (2011.01)

(52) U.S. Cl.
    CPC ............... *G09G 5/377* (2013.01); *G09G 5/38* (2013.01); *G10L 15/22* (2013.01); *G10L 15/26* (2013.01); *G09G 2320/0613* (2013.01); *G09G 2340/12* (2013.01); *G09G 2354/00* (2013.01)

(58) Field of Classification Search
    CPC ............ G06F 3/015; G02B 2027/0178; G02B 27/0172; A63F 13/211; A63F 13/213; A63F 13/355; A63F 13/53; A63F 13/67; A63F 13/825; G09G 2320/0613; G09G 2340/12; G09G 2354/00; G09G 5/373; G09G 5/377; G09G 5/38
    See application file for complete search history.

(56) References Cited

U.S. PATENT DOCUMENTS

| | | | |
|---|---|---|---|
| 2014/0361977 A1* | 12/2014 | Stafford | G06F 3/013 345/156 |
| 2015/0070262 A1* | 3/2015 | Peters | G06F 3/013 345/156 |
| 2015/0130689 A1* | 5/2015 | Sugden | G02B 27/017 345/8 |
| 2016/0042566 A1* | 2/2016 | Mao | A63F 13/213 463/32 |
| 2016/0282618 A1 | 9/2016 | Kon et al. | |
| 2017/0076486 A1* | 3/2017 | Aizawa | A63F 13/428 |
| 2017/0173454 A1* | 6/2017 | Begum | A63F 13/215 |
| 2018/0021684 A1* | 1/2018 | Benedetto | H04N 21/274 463/24 |
| 2018/0321493 A1* | 11/2018 | Kim | G06F 3/012 |
| 2020/0098193 A1* | 3/2020 | Mao | A63F 13/53 |

FOREIGN PATENT DOCUMENTS

| | | |
|---|---|---|
| JP | 2006-201853 A | 8/2006 |
| JP | 2010-074775 A | 4/2010 |
| JP | 2015-118332 A | 6/2015 |
| JP | 2016-062277 A | 4/2016 |
| WO | 2015/092968 A1 | 6/2015 |

* cited by examiner

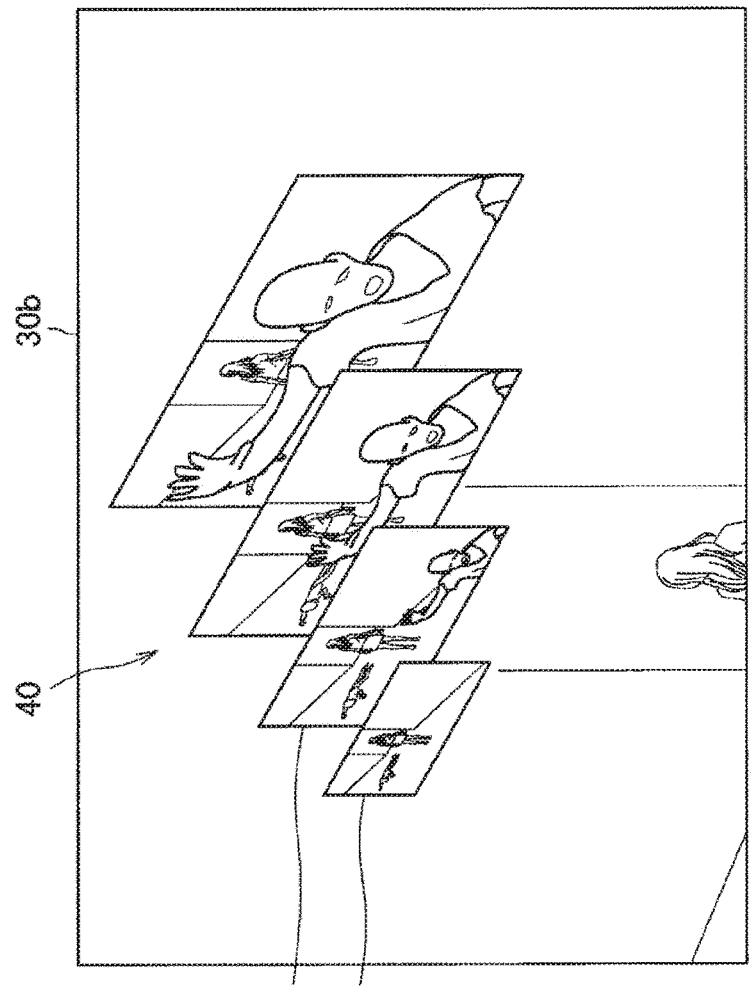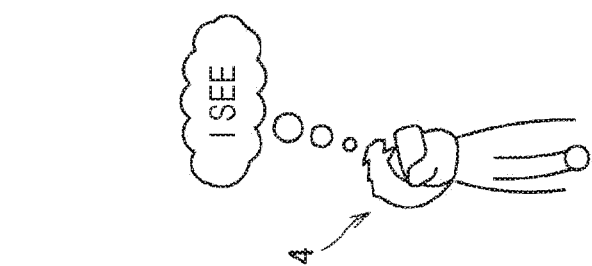

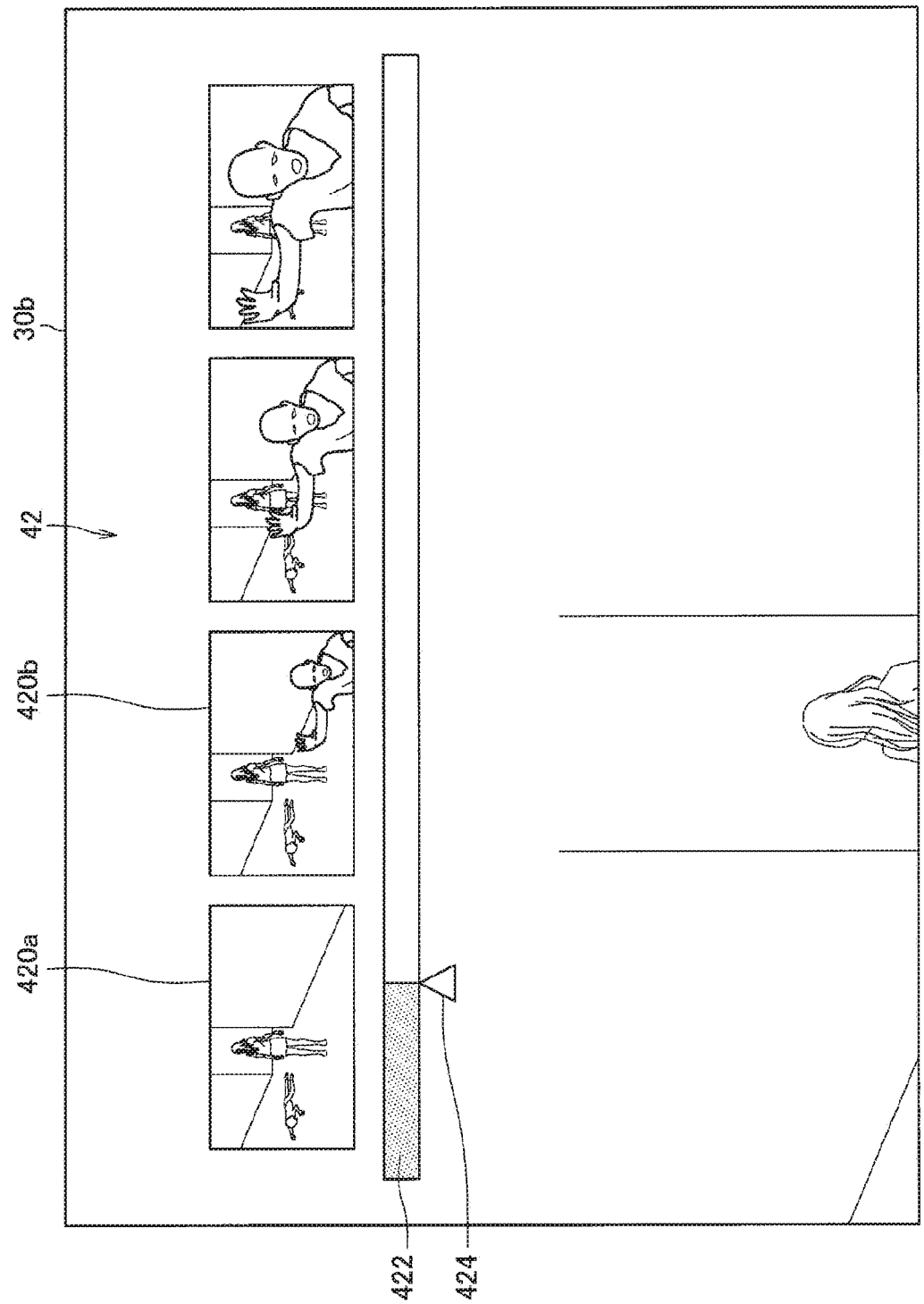

INFORMATION PROCESSING DEVICE AND INFORMATION PROCESSING METHOD FOR CONTROLLING USER IMMERSION DEGREE IN A VIRTUAL REALITY ENVIRONMENT

CROSS REFERENCE TO RELATED APPLICATIONS

This application is a U.S. National Phase of International Patent Application No. PCT/JP2017/044129 filed on Dec. 8, 2017, which claims priority benefit of Japanese Patent Application No. JP 2017-054197 filed in the Japan Patent Office on Mar. 21, 2017. Each of the above-referenced applications is hereby incorporated herein by reference in its entirety.

TECHNICAL FIELD

The present disclosure relates to an information processing device, an information processing method, and a program.

BACKGROUND ART

Conventionally, various technologies related to virtual reality (VR) have been developed. In VR, a user can view/listen a video generated by a computer with a high realistic feeling.

For example, Patent Document 1 describes a technology for stopping a display of a VR image depending on importance of an event that has occurred in a real world when the VR image is displayed on a display unit.

CITATION LIST

Patent Document

Patent Document 1: Japanese Patent Application Laid-Open No. 2015-118332

SUMMARY OF THE INVENTION

Problems to be Solved by the Invention

However, in the technology described in Patent Document 1, it has not been considered to perform display control for lowering an immersion degree of a user during a period in which the VR image is displayed on the display unit.

Therefore, the present disclosure proposes a novel and improved information processing device, information processing method, and program capable of appropriately suppressing an immersion degree of a user who is using a virtual reality content.

Solutions to Problems

According to the present disclosure, there is provided an information processing device including: an acquisition unit that acquires excitement information regarding use of a virtual reality content or information regarding an action of a first user who is using the content; and an output control unit that performs display control for lowering an immersion degree of the first user on the basis of the excitement information or the information regarding the action of the first user during a period in which the content is displayed by a display unit.

Furthermore, according to the present disclosure, there is provided an information processing method including: acquiring excitement information regarding use of a virtual reality content or information regarding an action of a first user who is using the content; and performing display control for lowering an immersion degree of the first user by a processor on the basis of the excitement information or the information regarding the action of the first user during a period in which the content is displayed by a display unit.

Furthermore, according to the present disclosure, there is provided a program for causing a computer to function as: an acquisition unit that acquires excitement information regarding use of a virtual reality content or information regarding an action of a first user who is using the content; and an output control unit that performs display control for lowering an immersion degree of the first user on the basis of the excitement information or the information regarding the action of the first user during a period in which the content is displayed by the display unit.

Effects of the Invention

As described above, according to the present disclosure, it is possible to appropriately suppress an immersion degree of a user who is using a virtual reality content. Note that an effect described here is not necessarily limited, and may be any effect described in the present disclosure.

BRIEF DESCRIPTION OF DRAWINGS

FIG. 7B is an explanatory diagram illustrating the first example of display control for lowering an immersion degree according to the first embodiment.

FIG. 8 is an explanatory diagram illustrating a modified example of the display control illustrated in FIG. 7B.

MODE FOR CARRYING OUT THE INVENTION

Figure 1:
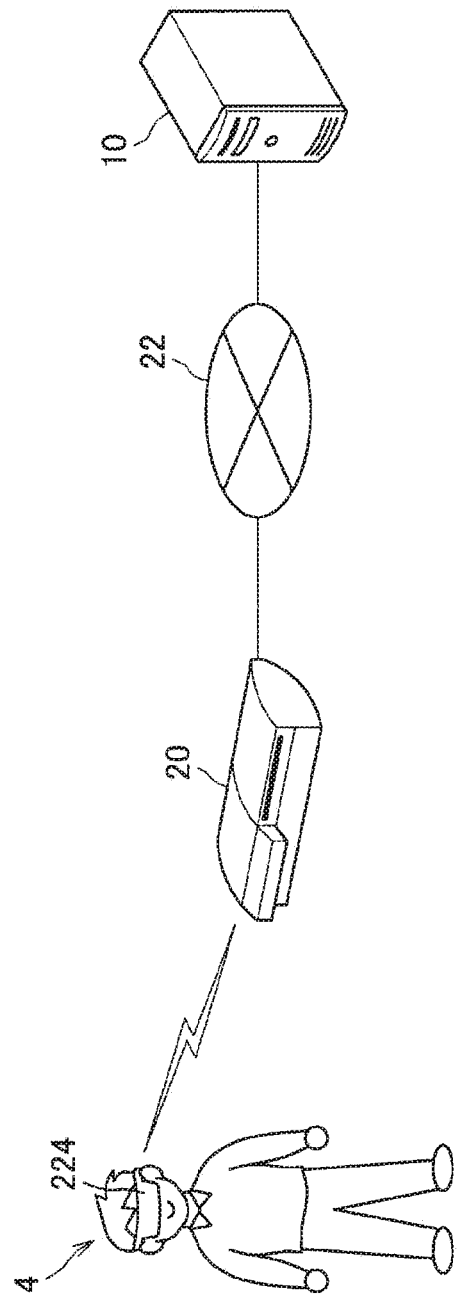
FIG. 1 is an explanatory diagram illustrating a configuration example of an information processing system common to each embodiment of the present disclosure.

Hereinafter, preferred embodiments of the present disclosure will be described in detail with reference to the accompanying drawings. Note that, in the present specification and the drawings, components having substantially the same functional configuration will be denoted by the same reference numerals and an overlapping description will be omitted.

Furthermore, in the present specification and the drawings, a plurality of components having substantially the same functional configuration may be distinguished from each other by attaching different alphabets after the same reference numerals. For example, the plurality of components having substantially the same functional configuration is distinguished from each other as a client terminal 20a and a client terminal 20b, if necessary. However, in a case where the plurality of components having substantially the same functional configuration need not be particularly distinguished from each other, only the same reference numeral is attached to the plurality of components having substantially the same functional configuration. For example, in a case where the client terminal 20a and the client terminal 20b need not be particularly distinguished from each other, the client terminal 20a and the client terminal 20b are simply referred to as a client terminal 20.

Furthermore, a "mode for carrying out the invention" will be described in order of items shown below.
1. Configuration of Information Processing System
2. First Embodiment
3. Second Embodiment
4. Hardware Configuration
5. Modified Example Note that, in the present specification and the drawings, a server 10-1 according to a first embodiment of the present disclosure and a server 10-2 according to a second embodiment of the present disclosure may be collectively referred to as a server 10.

<<1. Configuration of Information Processing System>>

First, a configuration example of an information processing system common to each embodiment of the present disclosure will be described with reference to FIG. 1. As illustrated in FIG. 1, the information processing system includes a server 10, a client terminal 20, and a communication network 22.

<1-1. Client Terminal 20>

The client terminal 20 is a device controlling display of a content such as, for example, a virtual reality (VR) content. For example, the client terminal 20 causes a display unit 224 as described later to display the VR content. Note that a type of VR content can be various types such as, for example, a movie (for example, a horror movie, a comedy movie, or the like), a game (for example, a fighting game, a romance game, or the like), or a live sport.

Furthermore, the display unit 224 can be a head mounted device (for example, a wearable device such as a head mounted display (HMD)) as illustrated in FIG. 1.

Note that only one client terminal 20 is illustrated in FIG. 1, but the present disclosure is not limited to such an example, and a plurality of client terminals 20 can be connected to the communication network 22. In this case, each of the plurality of client terminals 20 can communicate with the server 10 through the communication network 22.

(1-1-1. Functional Configuration)

Figure 2:
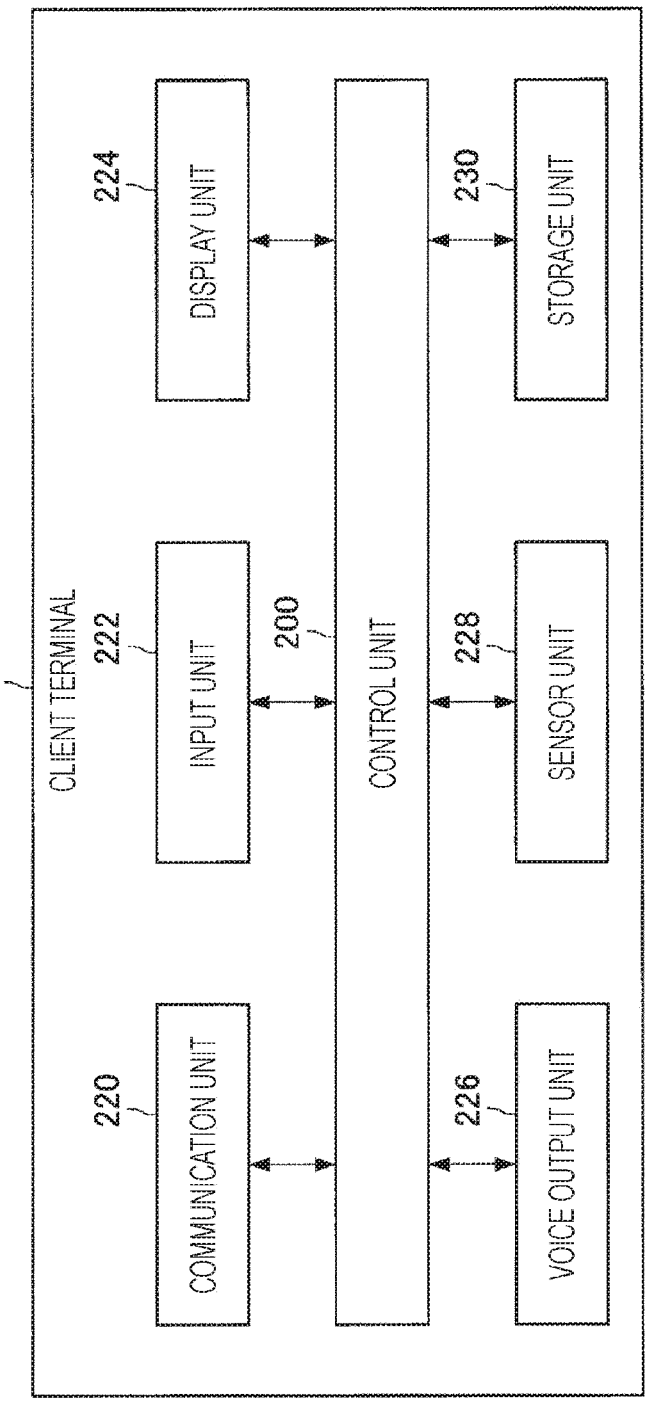
FIG. 2 is a functional block diagram illustrating a functional configuration example of a client terminal 20 common to each embodiment.

Here, an example of a functional configuration of the client terminal 20 will be described with reference to FIG. 2. As illustrated in FIG. 2, the client terminal 20 includes a control unit 200, a communication unit 220, an input unit 222, a display unit 224, a voice output unit 226, a sensor unit 228, and a storage unit 230. Note that the present disclosure is not limited to such an example, and one or more of the input unit 222, the display unit 224, the voice output unit 226, and the sensor unit 228 may be configured as another device capable of communicating with the client terminal 20 instead of being included in the client terminal 20.

(1-1-1-1. Sensor Unit 228)

The sensor unit 228 includes a camera (image sensor), a depth sensor, an acceleration sensor, a gyroscope, a pulse sensor, a humidity sensor, a respiration sensor, an electroencephalogram sensor, a myoelectric sensor, and/or a microphone.

For example, the sensor unit 228 (camera) captures an image of a user's body (mouth, eyes, arms, or the like) or the like. Furthermore, the sensor unit 228 (microphone) collects a sound such as a user's utterance. Furthermore, the sensor unit 228 (humidity sensor, pulse sensor, respiration sensor, electroencephalogram sensor, myoelectric sensor, or the like) can measure, for example, biometric information of the user, such as an amount of perspiration, an amount of pulse, an amount of respiration, an electroencephalogram, and a myoelectric potential of the user.

Note that at least one type of sensor (for example, the acceleration sensor, the electroencephalogram sensor, or the like) included in the sensor unit 228 can be worn by the user. Furthermore, the at least one type of sensor may be configured as a device integrated with the display unit 224 or may be a wearable device separate from the display unit 224.

Furthermore, at least one type of sensor (for example, the camera, the depth sensor, or the like) included in the sensor unit 228 may not only be worn by the user, but also be separately arranged in an actual space (for example, a room or the like) in which the user is positioned.

(1-1-1-2. Control Unit 200)

The control unit 200 generally controls an operation of the client terminal 20 using, for example, a central processing unit (CPU), a random access memory (RAM), or the like embedded in the client terminal 20.

For example, the control unit 200 acquires a sensing result by the sensor unit 228 from the sensor unit 228, and causes the communication unit 220 to transmit the sensing result to the server 10.

Furthermore, the control unit 200 causes the communication unit 220 to transmit information (hereinafter, referred to as content information) regarding the VR content that is being used by the user to the server 10. Here, the content information includes identification information of the VR content, a type of VR content, or the like.

Furthermore, the control unit 200 causes the communication unit 220 to transmit information (hereinafter, referred to as user information) regarding the user who is using the VR content to the server 10. Here, the user information includes, for example, an ID, a name, an age, a gender, and the like of the user.

(1-1-1-3. Communication Unit 220)

The communication unit 220 transmits and receives information to and from another device. For example, the communication unit 220 transmits various sensing results by the sensor unit 228, the content information, the user information, and the like to the server 10 according to the control of the control unit 200. Furthermore, although details will be described later, the communication unit 220 receives control information of display for the display unit 224 and output control information of a voice for the voice output unit 226 from the server 10.

(1-1-1-4. Input Unit 222)

The input unit 222 receives various inputs of the user. For example, the input unit 222 receives an input of operation information of the user for the VR content that is being displayed on the display unit 224.

The input unit 222 can include a touch panel, a button, a lever, a switch, and the like. For example, the input unit 222 may be a controller that can communicate with the client terminal 20 in a wired or wireless manner.

(1-1-1-5. Display Unit 224)

The display unit 224 displays a video according to the control of the control unit 200. The display unit 224 can be configured as a non-transmissive display device. For example, the display unit 224 can include a liquid crystal display (LCD), an organic light emitting diode (OLED), and the like. Note that, in this case, a video of a region in front of the user, captured by the sensor unit 228 (camera) may be displayed on the display unit 224.

(1-1-1-6. Voice Output Unit 226)

The voice output unit 226 outputs a voice according to the control of the control unit 200. The voice output unit 226 can be configured as, for example, a speaker, an earphone, a headphone, or the like. Note that the voice output unit 226 and the display unit 224 may be configured as an integral device.

(1-1-1-7. Storage Unit 230)

The storage unit 230 stores various data and various software.

<1-2. Server 10>

The server 10 is an example of an information processing device in the present disclosure. The server 10 can perform various types of control (for example, display control, voice output control, and the like) on the client terminal 20 through the communication network 22. For example, the server 10 performs the display control on the display unit 224 on the basis of information or the like received from the client terminal 20, during a period in which the VR content is displayed on the display unit 224.

Note that only one server 10 is illustrated in FIG. 1, but the present disclosure is not limited to such an example, and functions of the server 10 according to each embodiment may be realized by a plurality of computers operated in cooperation with one another.

<1-3. Communication Network 22>

The communication network 22 is a wired or wireless transmission path of information transmitted from a device connected to the communication network 22. For example, the communication network 22 may include a public network such as a telephone network, the Internet, or a satellite communication network, various local area networks (LANs) including Ethernet (registered trademark), a wide area network (WAN), or the like. Furthermore, the communication network 22 may include a dedicated line network such as the Internet protocol-virtual private network (IP-VPN).

<1-4. Summary of Problem>

Figure 3:
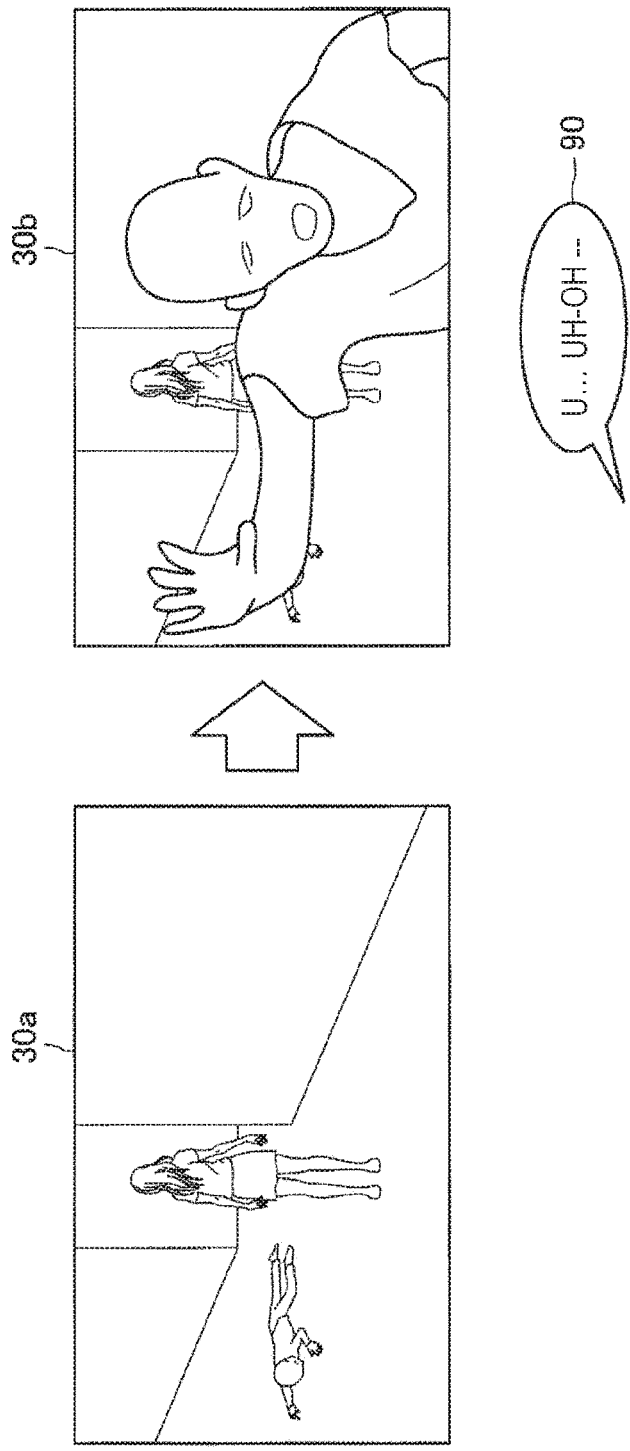
FIG. 3 is an explanatory diagram for describing a problem of the present disclosure.

The configuration of the information processing system common to each embodiment has been described hereinabove. By the way, since the VR content has a strong immersion degree, the user can be immersed in the VR content while using (such as viewing/listening) the VR content. Therefore, the user can perform an unintended action (for example, an utterance, bending himself/herself back, or the like). For example, as illustrated in FIG. 3, when the user is viewing/listening a video 30 of the VR content, there is a possibility that the user will be surprised at a content of a video 30b at a display timing of the video 30b and perform an unintended utterance 90. As a result, the user can trouble persons (for example, neighbors or the like) around him/her and may feel embarrassed after using the VR content.

Therefore, the server 10 according to each embodiment has been made in view of the above situation. The server 10 according to each embodiment can acquire excitement information regarding the use of the VR content or information regarding an action of the user who is using the VR content, and perform display control for lowering an immersion degree of the user on the basis of the excitement information or the information regarding the action of the user during a period in which the VR content is displayed by the display unit 224. Therefore, it is possible to appropriately suppress the immersion degree of the user who is using the VR content.

Here, the excitement information can be information indicating an excitement degree when the user himself/herself who is using the VR content or at least one other user who is different from the user has used the VR content in the past. For example, the excitement degree indicated by the excitement information may be a set value of excitement degrees when each of a plurality of users has used VR content in the past. Alternatively, the excitement information may be information indicating a current immersion degree (or excitation degree) of the user who is using the VR content. Note that, in this case, the excitement degree indicated by the excitement information can mean the current immersion degree (or excitation degree) of the user who is using the VR content.

Hereinafter, the respective embodiments of the present disclosure will be sequentially described in detail. Note that, hereinafter, "display control for lowering an immersion degree" according to a first embodiment may be referred to as "first display control for lowering an immersion degree" and "display control for lowering an immersion degree" according to a second embodiment may be referred to as "second display control for lowering an immersion degree".

2. First Embodiment

<2.1. Configuration>

Figure 4:
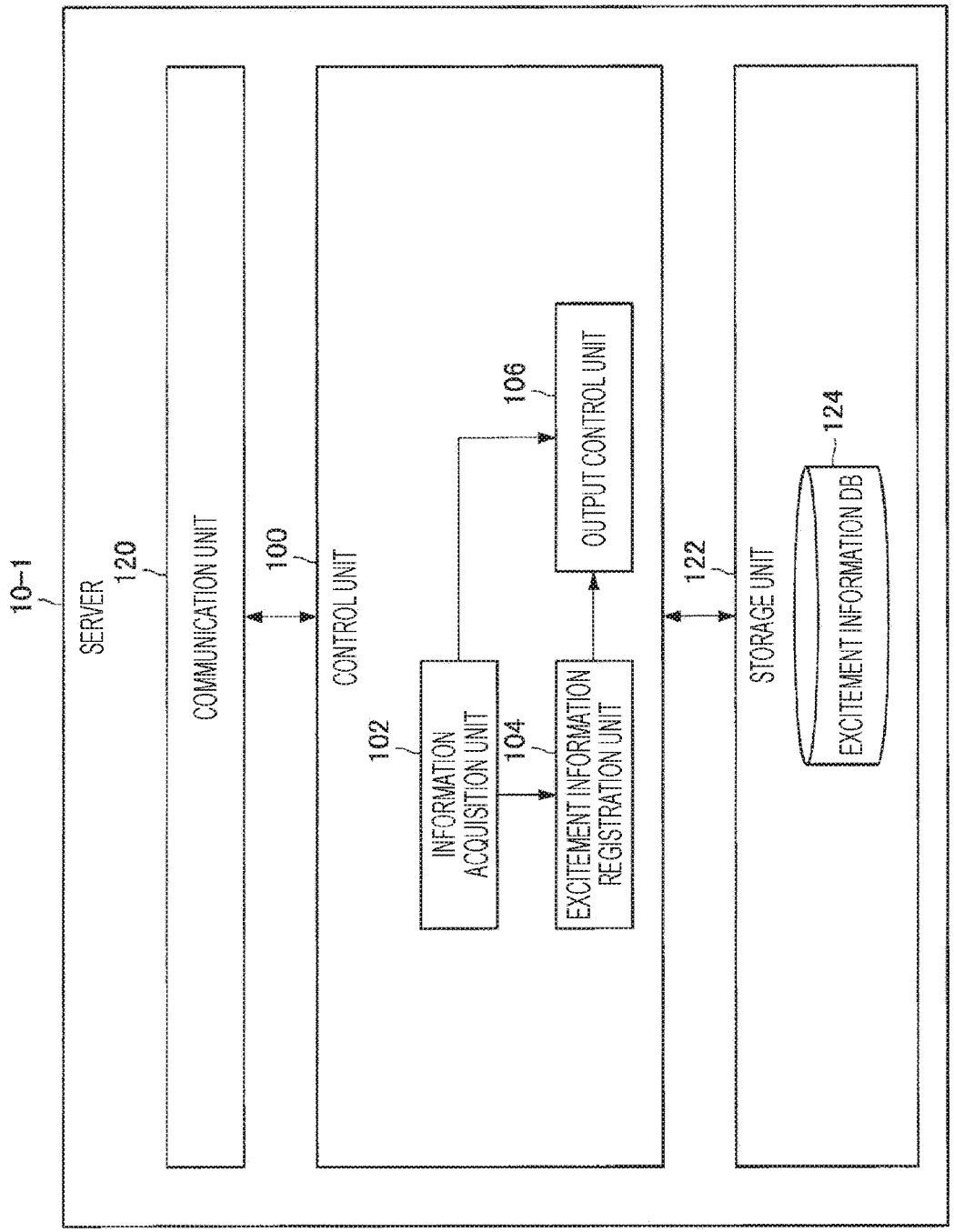
FIG. 4 is a functional block diagram illustrating a configuration example of a server 10-1 according to a first embodiment of the present disclosure.

First, a configuration according to a first embodiment will be described. FIG. 4 is a functional block diagram illustrating a configuration example of a server 10-1 according to the first embodiment. As illustrated in FIG. 4, the server 10-1 includes a control unit 100, a communication unit 120, and a storage unit 122.

(2-1-1. Control Unit 100)

The control unit 100 can include, for example, a processing circuit such as a CPU 150 as described later. The control unit 100 generally controls an operation of the server 10-1. Furthermore, as illustrated in FIG. 4, the control unit 100 includes an information acquisition unit 102, an excitement information registration unit 104, and an output control unit 106.

(2-1-2. Information Acquisition Unit 102)

The information acquisition unit 102 is an example of an acquisition unit in the present disclosure. The information acquisition unit 102 acquires various sensing results, content information, and user information received from at least one client terminal 20.

Furthermore, the information acquisition unit 102 acquires excitement information regarding a VR content indicated by the received content information on the basis of, for example, the received sensing results and the like.

(2-1-2-1. Acquisition Example of Excitement Information: Information Regarding Mouth)

Hereinafter, an acquisition example of excitement information by the information acquisition unit 102 will be described in detail. For example, the information acquisition unit 102 acquires the excitement information on the basis of a result of voice recognition of sound information of a collected user's utterance, received from at least one client terminal 20. As an example, the information acquisition unit 102 first performs voice recognition on the collected user's utterance, and analyzes morpheme information by performing natural language processing on the voice recognition result. Then, the information acquisition unit 102 determines whether or not the voice recognition result includes an interjection on the basis of the analyzed morpheme information, and specifies that an excitement degree at a collection timing of the utterance is a predetermined threshold value or more and acquires excitement information indicating a specified result in a case where the voice recognition result includes the interjection.

Furthermore, the information acquisition unit 102 acquires the excitement information on the basis of an opened degree of a user's mouth (or a clenched degree of a user's teeth) specified from a captured image of the user's mouth, received from at least one client terminal 20. For example, the information acquisition unit 102 first recognizes whether or not the user's mouth is opened at a certain size or more on the basis of the captured image of the user's mouth. Then, in a case where it is recognized that a duration of a time during which the user's mouth is opened at the certain size or more is a predetermined time or more, the information acquisition unit 102 specifies that an excitement degree at a photographed timing of the captured image of the user's mouth is a predetermined threshold value or more, and acquires excitement information indicating a specified result. Furthermore, in a case where it is recognized that the duration of the time during which the user's mouth is opened at the certain size or more is less than the predetermined time, the information acquisition unit 102 may acquire excitement information indicating that the excitement degree of the user at the photographed timing of the captured image of the user's mouth is less than the predetermined threshold value.

Furthermore, the information acquisition unit 102 acquires the excitement information on the basis of an excitation degree of specified from voice analysis of the collected user's vocalization (utterance or the like). For example, the information acquisition unit 102 first decides the excitation degree of the user by analyzing the collected user's vocalization. Then, in a case where the decided excitation degree is a predetermined threshold value or more, the information acquisition unit 102 specifies that an excitement degree of the user at a collected timing of the vocalization is a predetermined threshold value or more, and acquires excitement information indicating a specified result. Furthermore, in a case where the decided excitation degree is less than the predetermined threshold value, the information acquisition unit 102 may acquire excitement information indicating that the excitement degree of the user at the collected timing of the vocalization is less than the predetermined threshold value.

Furthermore, the information acquisition unit 102 acquires the excitement information on the basis of a volume of the collected user's vocalization, received from at least one client terminal 20. For example, the information acquisition unit 102 first determines whether or not the volume of the collected user's vocalization is a predetermined threshold value or more. Then, in a case where the volume of the user's vocalization is a predetermined threshold value or more, the information acquisition unit 102 specifies that an excitement degree of the user at a collected timing of the vocalization is a predetermined threshold value or more, and acquires excitement information indicating a specified result. Furthermore, in a case where the volume of the user's vocalization is less than the predetermined threshold value, the information acquisition unit 102 may acquire excitement information indicating that the excitement degree of the user at the collected timing of the vocalization is less than the predetermined threshold value.

(2-1-2-2. Acquisition Example of Excitement Information: Information Regarding Eye)

Furthermore, the information acquisition unit 102 acquires the excitement information on the basis of, for example, an opened degree of a pupil specified from a captured image of a user's eye, received from at least one client terminal 20. For example, the information acquisition unit 102 first detects the pupil from the captured image of the user's eye. Then, in a case where an opened degree (size) of the detected pupil is a predetermined threshold value or more, the information acquisition unit 102 specifies that an excitement degree of the user at a photographed timing of the captured image of the user's eye is a predetermined threshold value or more, and acquires excitement information indicating a specified result. Furthermore, in a case where the opened degree of the detected pupil is less than the predetermined threshold value, the information acquisition unit 102 may acquire excitement information indicating that the excitement degree of the user at the photographed timing of the captured image of the user's eye is less than the predetermined threshold value.

Furthermore, the information acquisition unit 102 acquires the excitement information on the basis of, for example, the number of blinks specified from a captured moving image of the user's eye, received from at least one client terminal 20. For example, the information acquisition unit 102 first detects the blinks from the captured moving image of the user's eye. Then, in a case where the number of blinks detected within a predetermined time is a predetermined threshold value or more, the information acquisition unit 102 specifies that an excitement degree of the user at a photographed timing of the captured moving image of the user's eye is a predetermined threshold value or more, and acquires excitement information indicating a specified result. Alternatively, in a case where the number of blinks detected within the predetermined time is excessively small, the information acquisition unit 102 may specify that an excitement degree of the user at a photographed timing of the captured moving image of the user's eye is a predetermined threshold value or more, and acquire excitement information indicating a specified result.

Furthermore, the information acquisition unit 102 acquires the excitement information on the basis of, for example, a congestion degree of the user's eye specified from the captured image of the user's eye, received from at least one client terminal 20. For example, the information acquisition unit 102 first detects a capillary vessel in the sclera (the white of the eye) from the captured image of the user's eye. Then, in a case where a congestion degree specified from a detection result is a predetermined threshold value or more, the information acquisition unit 102 specifies that an excitement degree of the user at the photographed timing of the captured image of the user's eye is a predetermined threshold value or more, and acquires excitement information indicating a specified result. Furthermore, in a case where the congestion degree specified from the detection result is less than the predetermined threshold value, the information acquisition unit 102 may acquire excitement information indicating that the excitement degree of the user at the photographed timing of the captured image of the user's eye is less than the predetermined threshold value.

(2-1-2-3. Acquisition Example of Excitement Information: Biometric Information)

Furthermore, the information acquisition unit 102 acquires the excitement information on the basis of a sensing result of a perspiration degree (perspiration amount or the like) of the user, received from at least one client terminal 20. For example, the information acquisition unit 102 first determines the perspiration degree of the user on the basis of the sensing result. Then, in a case where the determined perspiration degree is a predetermined threshold value or more, the information acquisition unit 102 specifies that an excitement degree of the user at the time of performing the sensing is a predetermined threshold value or more, and acquires excitement information indicating a specified result. Furthermore, in a case where the determined perspiration degree is less than the predetermined threshold value, the information acquisition unit 102 may acquire excitement information indicating that the excitement degree of the user at the time of performing the sensing is less than the predetermined threshold value.

Furthermore, the information acquisition unit 102 acquires the excitement information on the basis of a sensing result of a pulse rate of the user or a sensing result of a respiration rate of the user, received from at least one client terminal 20. For example, the information acquisition unit 102 first determines whether or not the pulse rate (or the respiration rate) of the user is a predetermined threshold value or more on the basis of the sensing result. Then, in a case where the determined the pulse rate (or respiration rate) is the predetermined threshold value or more, the information acquisition unit 102 specifies that an excitement degree of the user at the time of performing the sensing is a predetermined threshold value or more, and acquires excitement information indicating a specified result. Furthermore, in a case where the determined pulse rate (or respiration rate) is less than the predetermined threshold value, the information acquisition unit 102 may acquire excitement information indicating that the excitement degree of the user at the time of performing the sensing is less than the predetermined threshold value. Note that the pulse rate and/or the respiration rate may be sensed by dedicated sensors (a pulse sensor, a respiration sensor or the like), respectively, or may be specified on the basis of image recognition for a captured image of a user's body (for example, a chest).

Furthermore, the information acquisition unit 102 acquires the excitement information on the basis of an excitation degree specified from a sensing result of an electroencephalogram, received from at least one client terminal 20. For example, the information acquisition unit 102 first specifies the excitation degree on the basis of the sensing result. Then, in a case where the specified excitation degree is a predetermined threshold value or more (for example, in a case where it is detected that an electroencephalogram of a γ (gamma) wave of 30 Hz or more is output), the information acquisition unit 102 specifies that an excitement degree of the user at the time of performing the sensing is a predetermined threshold value or more, and acquires excitement information indicating a specified result. Furthermore, in a case where the specified excitation degree is less than the predetermined threshold value, the information acquisition unit 102 may acquire excitement information indicating that the excitement degree of the user at the time of performing the sensing is less than the predetermined threshold value.

(2-1-2-4. Acquisition Example of Excitement Information: Physical Information)

Furthermore, the information acquisition unit 102 can acquire the excitement information on the basis of, for example, a surprise degree of a facial expression of the user, an amount of nodding, an amount of hand motion, a flared state of a nostrils, a forward inclination degree of a neck, or the like, recognized from the captured image of the user received from at least one client terminal 20. For example, in a case where the recognized forward inclination degree of the neck is a predetermined threshold value or more, the information acquisition unit 102 specifies that an excitement degree of the user at the time of performing the sensing is a predetermined threshold value or more, and acquires excitement information indicating a specified result.

(2-1-2-5. Acquisition Example of Excitement Information: Operation Information)

Furthermore, the information acquisition unit 102 can acquire the excitement information on the basis of operation information of the user for the VR content, received from at least one client terminal 20. For example, in a case where the operation information indicates that the same timing or the same scene in the VR content has been reproduced plural times, the information acquisition unit 102 specifies that an excitement degree of the user in the reproduction timing or the reproduction scene is a predetermined threshold value or more, and acquires excitement information indicating a specified result.

(2-1-2-6. Acquisition Example of Excitement Information: Acquisition from Network)

Furthermore, the information acquisition unit 102 can acquire the excitement information on the basis of, for example, information (for example, character strings (messages or the like), the number of clicks on a "Like" button, or the like) uploaded to a social networking service (SNS), an electronic bulletin board, an information sharing service, a blog, and the like (hereinafter referred to as an "SNS or the like") and content information received from client terminal 20. For example, the information acquisition unit 102 first searches for a character string associated with the content information received from the client terminal 20 among the character strings uploaded to the SNS or the like. Then, the information acquisition unit 102 analyzes a meaning (content) of the found character string, and acquires excitement information on the basis of an analysis result.

As an example, it is assumed that a character string of "I fought with my last enemy "XYZ" and it was very interesting." was retrieved from the SNS or the like regarding the VR content indicated by the received content information. In this case, the information acquisition unit 102 can specify that an excitement degree of the user in an event that "XYZ" occurs in the VR content is a predetermined threshold value or more, and acquire excitement information indicating a specified result. For example, the information acquisition unit 102 first extracts a proper noun of "XYZ" from the character string, and acquires an image corresponding to the proper noun by searching the SNS or the like. Next, the information acquisition unit 102 performs similar image search of the acquired image on the VR content. Then, in a case where an image including "XYZ" is found, the information acquisition unit 102 specifies that an excitement degree of the user in an event that "XYZ" occurs in the VR content is a predetermined threshold value or more, and acquire excitement information indicating a specified result.

Alternatively, the information acquisition unit 102 may acquire the excitement information on the basis of the number of posts of keyword information (for example, a character string to which a hash tag is attached, or the like) regarding the VR content to the SNS or the like. For example, the information acquisition unit 102 first acquires the number of posts of the keyword information to the SNS or the like per unit time for each keyword information regarding the VR content. Then, the information acquisition unit 102 specifies an excitement degree at the time of occurrence of the event corresponding to the keyword information according to the acquired number of posts, and acquires excitement information indicating a specified result. Note that the information acquisition unit 102 may specify that the excitement degree becomes larger as the number of posts of the keyword information to the SNS or the like per unit time becomes larger.

(2-1-3. Excitement Information Registration Unit 104)

The excitement information registration unit 104 stores the excitement information acquired by the information acquisition unit 102 in the excitement information DB 124. For example, the excitement information registration unit 104 stores the acquired excitement information in association with identification information of the VR content corresponding to the excitement information in the excitement information DB 124.

(2-1-4. Output Control Unit 106)

The output control unit 106 controls display on the display unit 224 and controls the output of the voice to the voice output unit 226. For example, the output control unit 106 performs first display control for lowering an immersion degree of the user who is using the VR content on the basis of the excitement information acquired by the information acquisition unit 102, during a period in which the VR content is displayed on the display unit 224.

Figure 5:
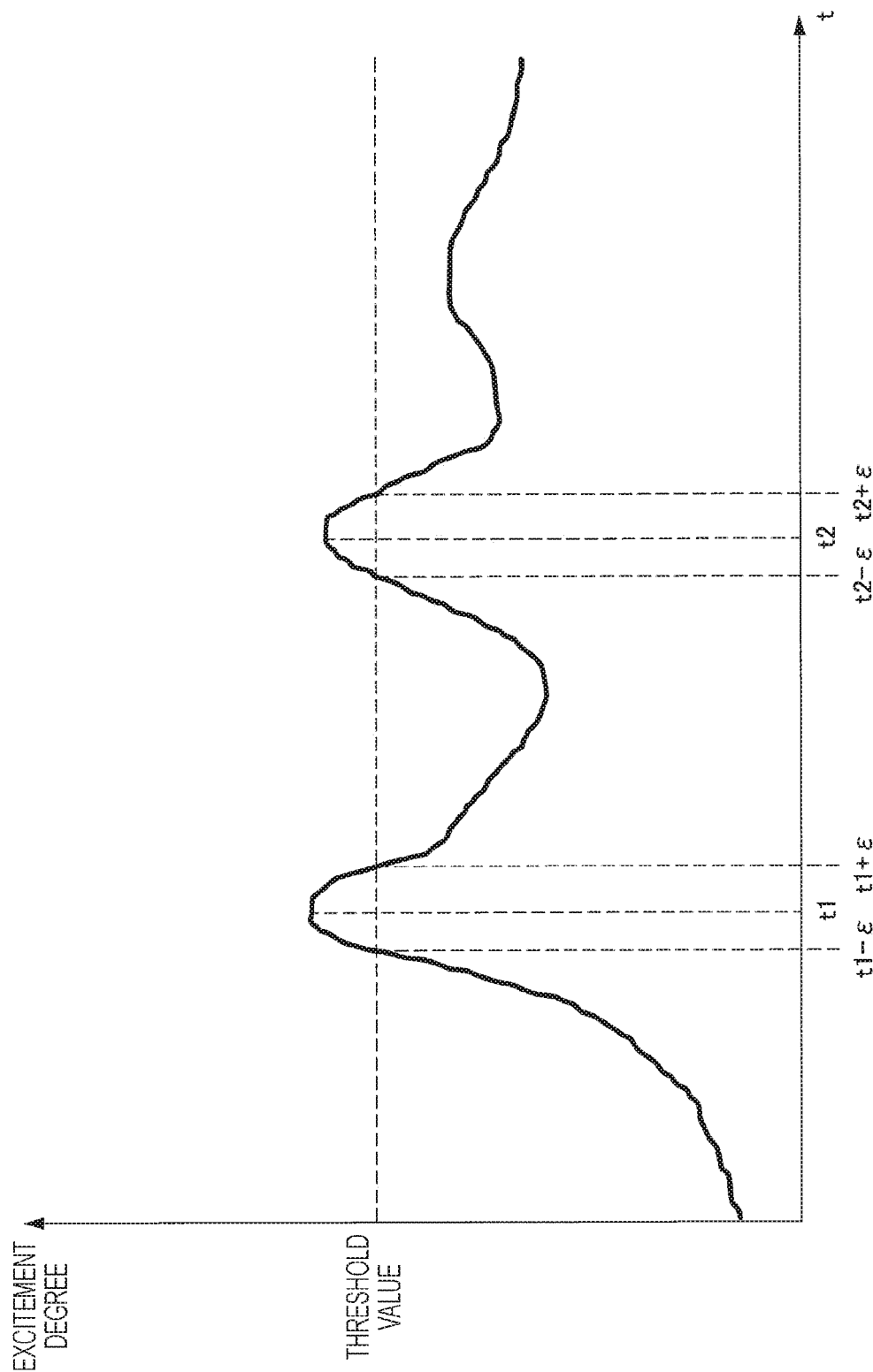
FIG. 5 is an example of a graph illustrating a correspondence relationship between a reproduction time of a virtual reality (VR) content and an excitement degree indicated by excitement information.

As an example, when the excitement degree indicated by the excitement information associated with the VR content becomes larger than a predetermined threshold value, the output control unit 106 performs the first display control for lowering an immersion degree. For example, in a case where the VR content is a moving image (movie or the like), a reproduction timing (or scene) of the VR content and the excitement degree indicated by the excitement information can be associated with each other, as in a graph illustrated in FIG. 5. In this case, the output control unit 106 starts the first display control for lowering an immersion degree at a reproduction timing ("t=t1-ε" or "t=t2-s" in an example illustrated in FIG. 5) (or scene) at which the excitement degree indicated by the excitement information associated with the VR content changes from a value less than or equal to the predetermined threshold value to a value larger than the predetermined threshold value.

Figure 6:
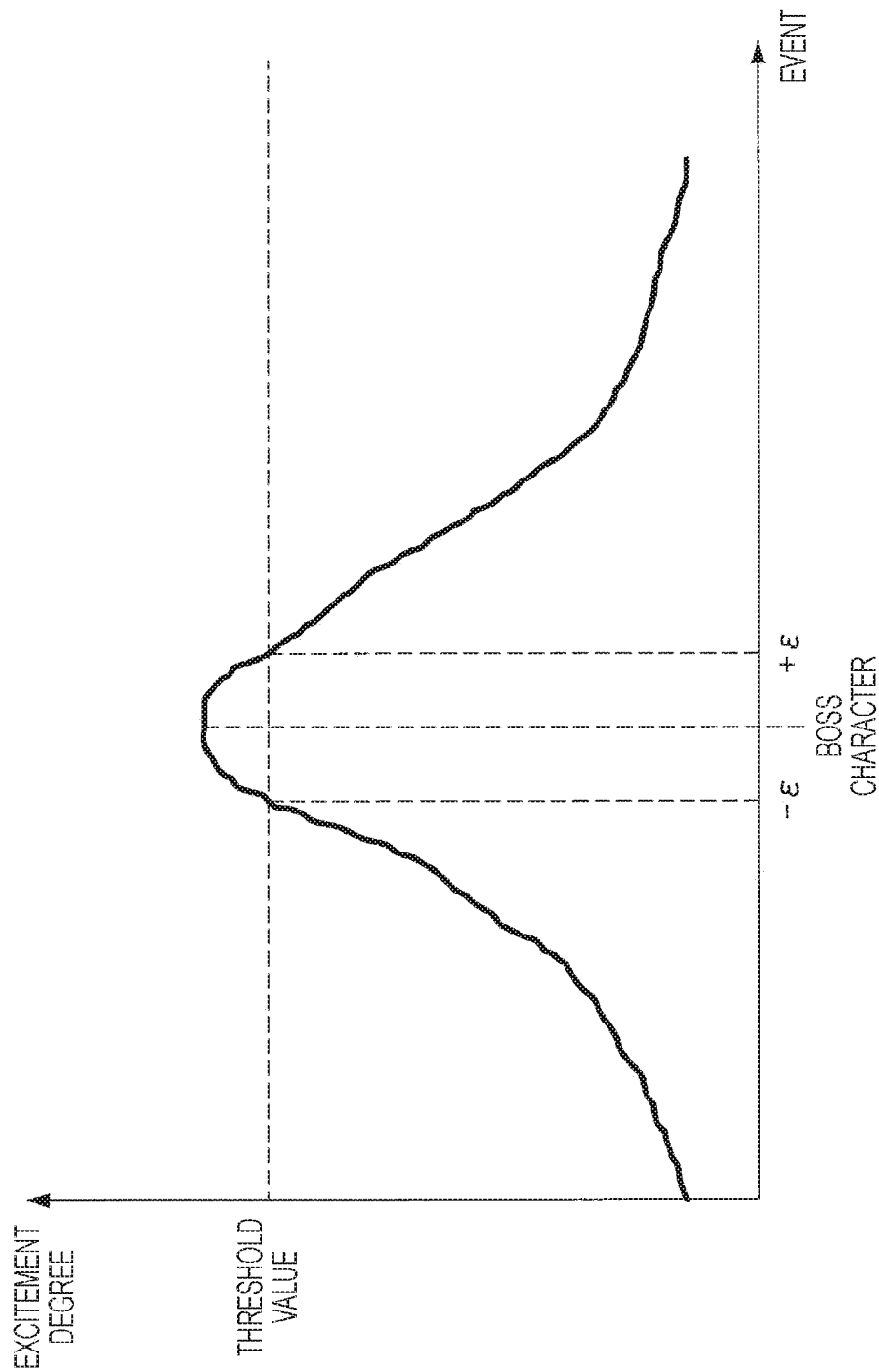
FIG. 6 is an example of a graph illustrating a correspondence relationship between event information of the VR content and the excitement degree indicated by the excitement information.

Furthermore, for example, in a case where the VR content is a game or the like, event information (or a place (geo-fence or the like) in a virtual space corresponding to the VR content) of the VR content and the excitement degree indicated by the excitement information can be associated with each other, as in a graph illustrated in FIG. 6. In this case, the output control unit 106 starts the first display control for lowering an immersion degree immediately before an event ("appearance of a boss character" in an example illustrated in FIG. 5) indicated by event information associated with an excitement degree larger than the predetermined threshold value occurs. Alternatively, when a character that is being operated by the user approaches the vicinity of the place in the virtual space corresponding to the VR content, associated with the excitement degree larger than the predetermined threshold value, the output control unit 106 may start the first display control for lowering an immersion degree.

(2-1-4-1. Display Example 1)

Hereinafter, a content of the "first display control for lowering an immersion degree" will be described in more detail. For example, the first display control for lowering an immersion degree can include causing the display unit 224 to superimpose and display a plurality of frame images extracted from a portion of the VR content after a current reproduction timing on a predetermined region of the VR content.

Figure 7A:
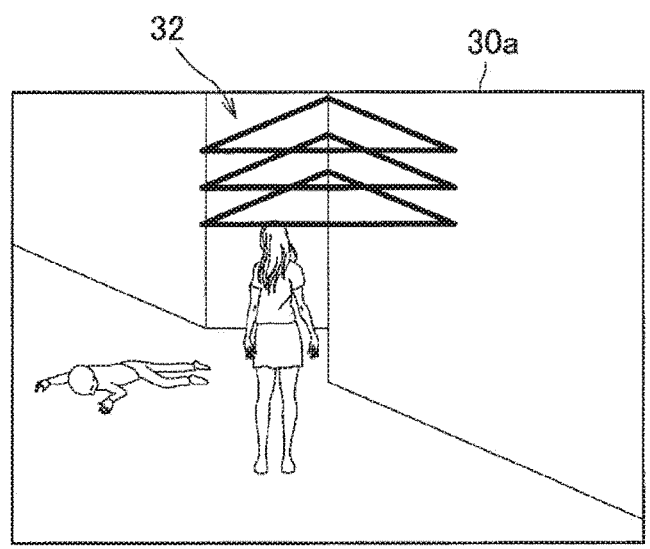
FIG. 7A is an explanatory diagram illustrating a first example of display control for lowering an immersion degree according to the first embodiment.
Figure 7C:
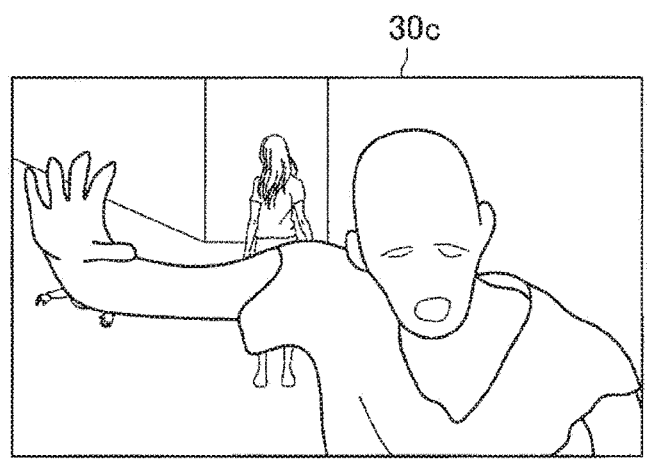
FIG. 7C is an explanatory diagram illustrating the first example of display control for lowering an immersion degree according to the first embodiment.

Here, the above functions will be described in more detail with reference to FIGS. 7A, 7B, and 7C. A video 30a illustrated in FIG. 7A is a video whose reproduction timing is the same as that the video 30a of the VR content illustrated in FIG. 3. Note that it is assumed that an excitement degree indicated by excitement information associated with the VR content changes from a value less than or equal to a predetermined threshold value to a value larger than the predetermined threshold value at the reproduction timing of the video 30a. In this case, as illustrated in FIG. 7A, the output control unit 106 first causes a guide display 32 for guiding a sight line of the user who is using the VR content to be superimposed and displayed on the VR content so that a predetermined region in the VR content is displayed on the display unit 224. Here, the guide display 32 is a user interface (UI) for guiding the sight line of the user so that a region in which there is no hindrance in using (viewing/listening) the VR content is displayed on the display unit 224. Note that, in an example illustrated in FIG. 7A, it is assumed that the region in which there is no hindrance in using the VR content exists in the VR content at an upper portion of FIG. 7A. Furthermore, in the example illustrated in FIG. 7A, the guide display 32 may be an animation in which it is repeated that triangles are upwardly added and displayed one by one.

Thereafter, in a case where it is detected that the sight line of the user has moved along a direction indicated by the guide display 32, as illustrated in FIG. 7B, the output control unit 106 extracts a plurality of frame images 400 (screen shots) from a portion of the VR content after a current reproduction timing, and causes a UI 40 including a plurality of frame images 400 to be superimposed and displayed on the VR content. According to this display example, in a case where reproduction of the VR content has been continued, the user is notified of a part of a video to be displayed in the future in advance. Therefore, an immersion degree of the user in the case where the reproduction of the VR content has been continued can be suppressed as compared with, for example, the present comparative example.

Thereafter, in a case where it is detected that an operation (for example, selection of any one of the plurality of frame images 400, or the like) of the user is performed on the UI 40, the output control unit 106 resumes the reproduction of the VR content according to the operation of the user. Therefore, for example, as illustrated in FIG. 7C, a video 30c after a display timing of the video 30a illustrated in FIG. 7A in the VR content is continuously displayed on the display unit 224.

Note that, as a modified example, the output control unit 106 may cause a UI 42 as illustrated in FIG. 8 instead of the UI 40 illustrated in FIG. 7B to be superimposed and displayed on the video 30b of the VR content. The UI 42 includes a plurality of frame images 420 extracted from a portion after the current reproduction timing, and a seek bar 422. In a case where the user moves a cursor 424 to a desired position in the seek bar 422, the output control unit 106 resumes (normal) reproduction of the VR content from a reproduction timing corresponding to a position of the cursor 424 after being moved.

(2-1-4-2. Display Example 2)

Furthermore, the first display control for lowering an immersion degree can include moving a position of a current viewpoint in the VR content backward with respect to a direction of the viewpoint.

Figure 9A:
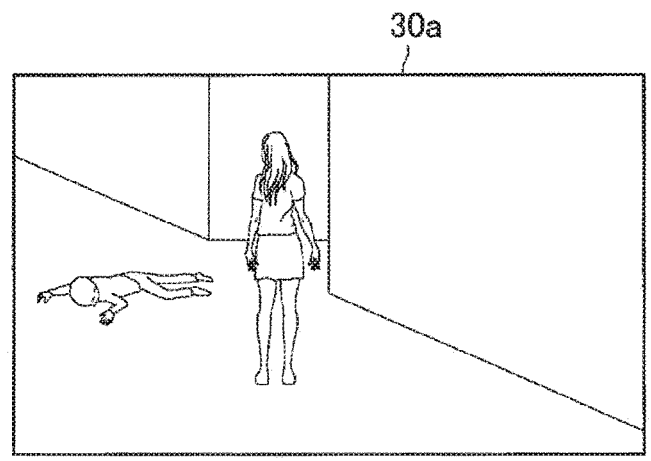
FIG. 9A is an explanatory diagram illustrating a second example of display control for lowering an immersion degree according to the first embodiment.

Here, the above functions will be described in more detail with reference to FIGS. 9A, 9B, and 9C. Note that it is assumed that an excitement degree indicated by excitement information associated with the VR content changes from a value less than or equal to a predetermined threshold value to a value larger than the predetermined threshold value at a display (reproduction) timing of a video 30a illustrated in FIG. 9A. In this case, at the display timing of the video 30a, the output control unit 106 first forcibly moves a position of a current viewpoint in the VR content backward by, for example, a predetermined distance (5 steps or the like) with respect to a direction of the viewpoint. For example, the output control unit 106 moves the position of the current viewpoint to a backward position at which it seems that there is no hindrance in using the VR content. Therefore, as illustrated in FIG. 9B, a video 30b of the VR content from the position of the viewpoint after the movement is displayed on the display unit 224.

Figure 9B:
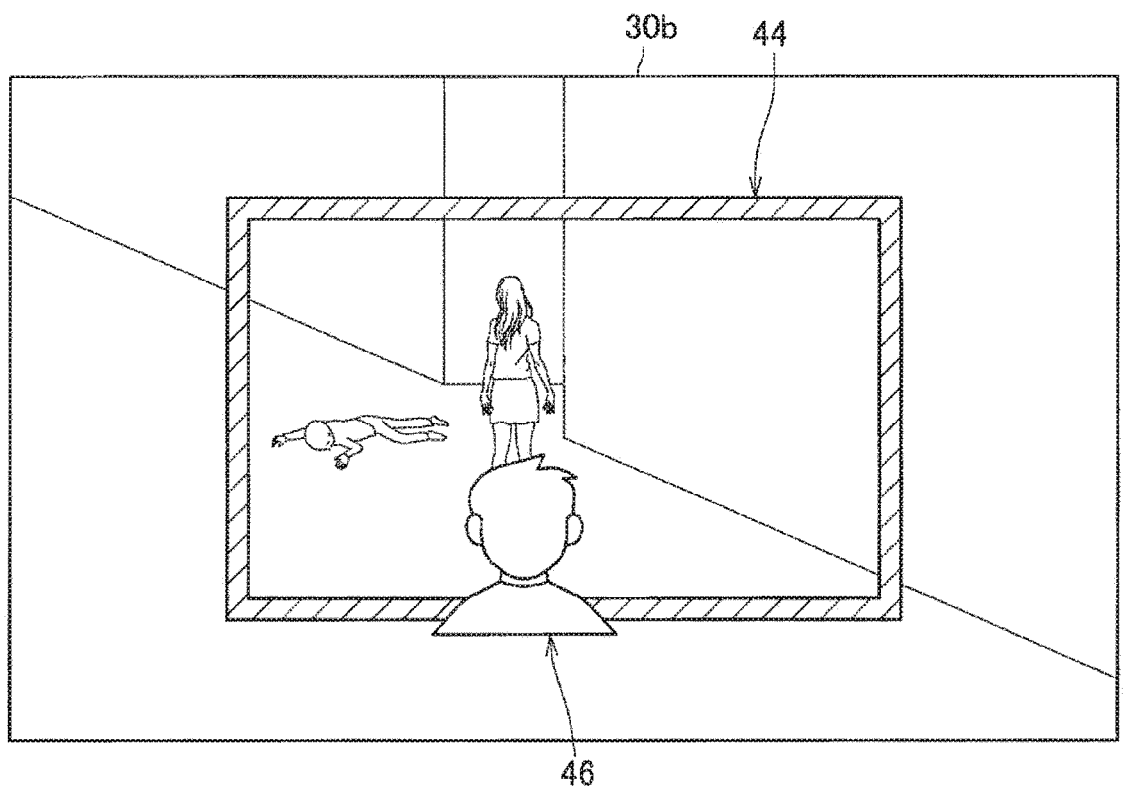
FIG. 9B is an explanatory diagram illustrating the second example of display control for lowering an immersion degree according to the first embodiment.

Moreover, the output control unit 106 causes an image 46 indicating a back surface of the user who is using the VR content to be superimposed and displayed on the video 30b, in the vicinity of the position of the viewpoint before the movement, as illustrated in FIG. 9B. According to the above display example, it is possible to display the video 30b in which it seems that the user who was viewing/listening the VR content at the position of the viewpoint before the movement looks down at himself/herself. Therefore, the user can be given unexpectedness, and it can thus be expected that the immersion degree of the user will be lowered.

Figure 9C:
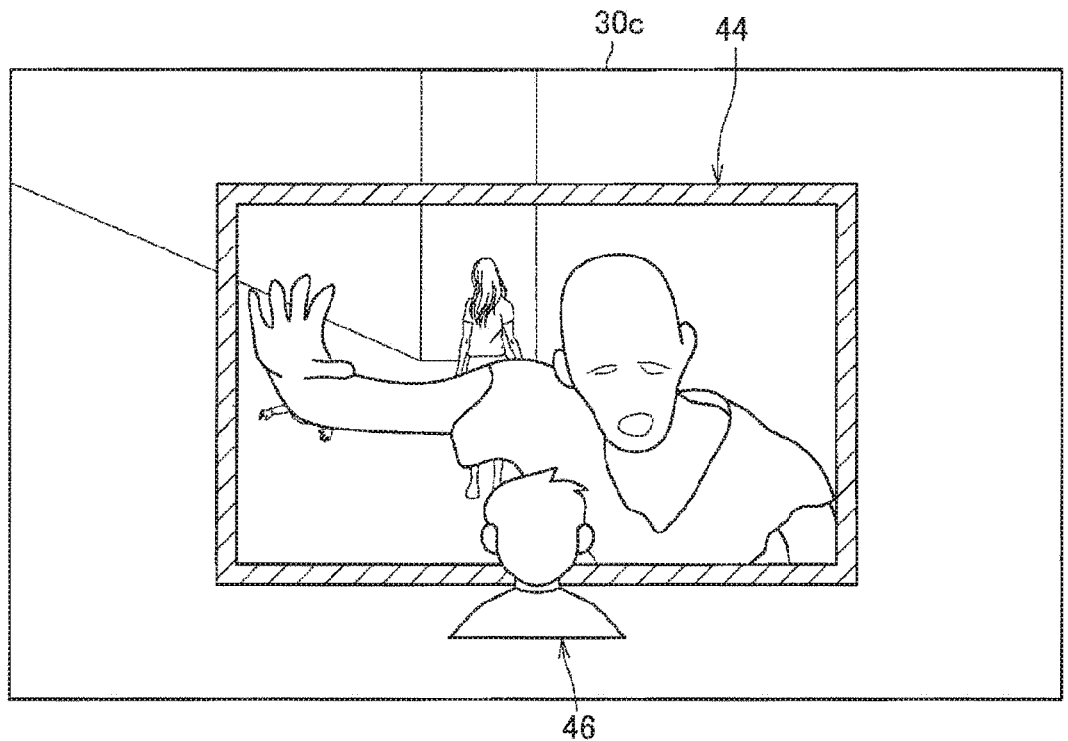
FIG. 9C is an explanatory diagram illustrating the second example of display control for lowering an immersion degree according to the first embodiment.

Note that after the video 30b is displayed and during a period in which the excitement degree indicated by the excitement information associated with the VR content is higher than the predetermined threshold value, for example, unless the user explicitly designates the movement of the viewpoint, the position of the viewpoint can be maintained, for example, as illustrated in FIG. 9C. Then, at a timing at which the excitement degree indicated by the excitement information associated with the VR content changes from a value higher than the predetermined threshold value to a value less than or equal to the predetermined threshold value, the output control unit 106 can return the position of the viewpoint to the position of the viewpoint before the movement.

(2-1-4-3. Display Example 3)

Furthermore, the first display control for lowering an immersion degree can include reducing a display size of the VR content on the display unit 224.

Figure 10A:
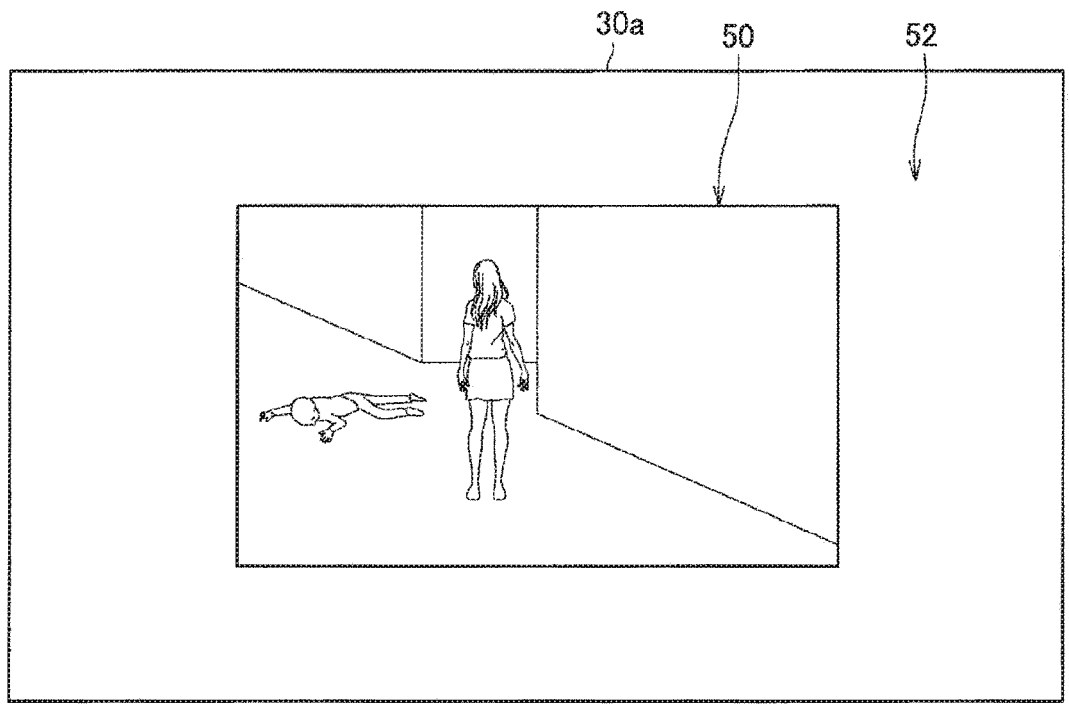
FIG. 10A is an explanatory diagram illustrating a third example of display control for lowering an immersion degree according to the first embodiment.

Here, the above functions will be described in more detail with reference to FIGS. 9A, 10A, and 10B. For example, at the display timing of the video 30a illustrated in FIG. 9A (that is, a timing at which the excitement degree indicated by the excitement information associated with the timing becomes larger than the predetermined threshold value), the output control unit 106 reduces a display size of a video 50 of the VR content and causes the display unit 224 to display the video having the reduced display size, and causes a display region 52 around the video 50 in the display unit 224 to be displayed in a predetermined color (for example, black or the like), as illustrated in FIG. 10A.

Figure 10B:
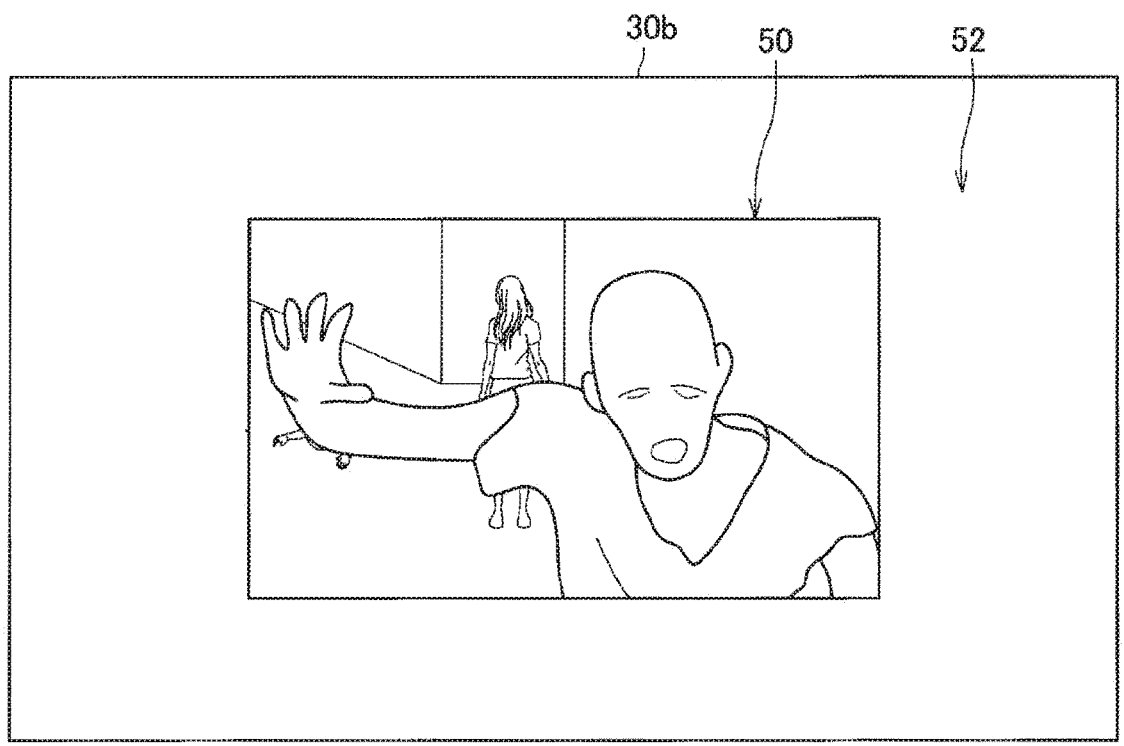
FIG. 10B is an explanatory diagram illustrating the third example of display control for lowering an immersion degree according to the first embodiment.

Note that after the video 30b is displayed and during a period in which the excitement degree indicated by the excitement information associated with the VR content is higher than the predetermined threshold value, (similarly to the "display example 2" described above), for example, unless the user explicitly designates the display size of the video of the VR content, the display size of the video can be maintained, for example, as illustrated in FIG. 10B. Then, at a timing at which the excitement degree indicated by the excitement information associated with the VR content changes from a value higher than the predetermined threshold value to a value less than or equal to the predetermined threshold value, the output control unit 106 can return the display size of the video to an original display size.

(2-1-5. Communication Unit 120)

The communication unit 120 can include, for example, a communication device 162 as described later. The communication unit 120 transmits and receives information to and from another device. For example, the communication unit 120 transmits display control information or voice output control information to the client terminal 20 according to the control of the output control unit 106. Furthermore, the communication unit 120 receives various sensing results, content information, user information, and the like from the client terminal 20.

(2-1-6. Storage Unit 122)

The storage unit 122 can include, for example, a storage device 160 as described later. The storage unit 122 stores, for example, various data such as the excitement information DB 124 and various pieces of software. Note that the excitement information DB 124 may be stored in another device with which the server 10 can communicate through the communication network 22, instead of being stored in the storage unit 122.

<2-2. Flow of Processing>

The configuration according to the first embodiment has been described hereinabove. Next, a flow of processing according to the first embodiment will be described in (2-2-1. Flow of Processing at the Time of Using Content) and (2-2-2. Flow of Registration Processing of Excitement Information).

(2-2-1. Flow of Processing at the Time of Using Content)

Figure 11:
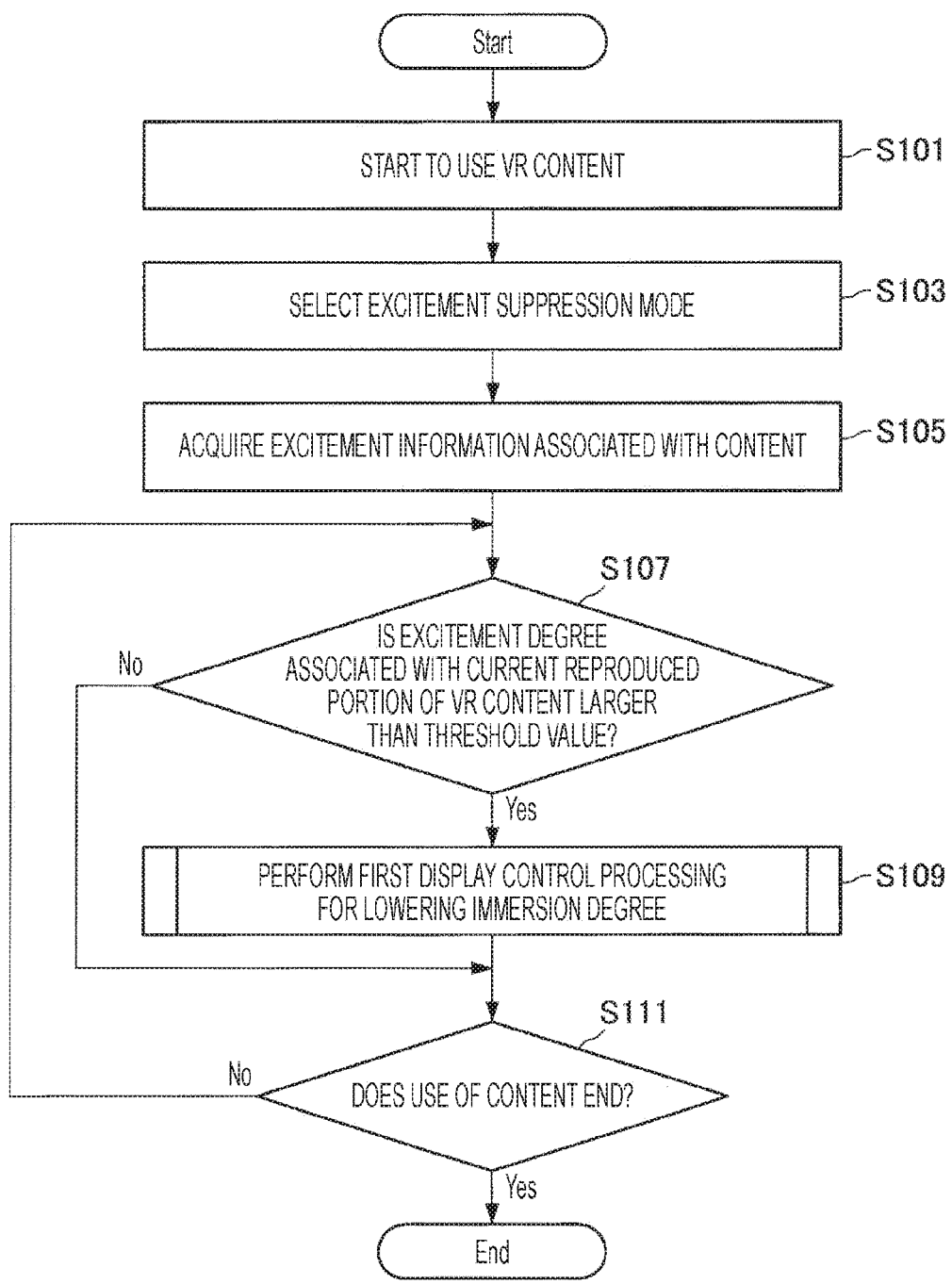
FIG. 11 is a flowchart illustrating the overall flow of "processing at the time of using a content" according to the first embodiment.

FIG. 11 is a flowchart illustrating the overall flow of "processing at the time of using a content" according to the first embodiment. As illustrated in FIG. 11, first, the user starts to use the VR content on the basis of, for example, the input of the user to the input unit 222 of the client terminal 20. Then, the client terminal 20 transmits various sensing results by the sensor unit 228, content information of the VR content that is being displayed on the display unit 224, user information of the user who is using the VR content, and the like, to the server 10 (S101).

Then, in a case where the user desires an excitement suppression mode, the user selects the excitement suppression mode (S103). Note that an example in which the user selects the excitement suppression mode will hereinafter be described.

Thereafter, the output control unit 106 of the server 10-1 extracts the excitement information associated with the VR content from the excitement information DB 124 (S105).

Subsequently, the output control unit 106 determines whether or not an excitement degree associated with a current reproduction portion of the VR content is larger than a predetermined threshold value (S107). In a case where the excitement degree is equal to or less than the predetermined threshold value (S107: No), the server 10-1 performs processing of S111 as described later.

On the other hand, in a case where the excitement degree is larger than the predetermined threshold value (S107: Yes), the output control unit 106 performs "first display control processing for lowering an immersion degree" as described later (S109).

Thereafter, in a case where the user gives an instruction on the end of the use of the VR content (S111: Yes), the flow of the processing ends. On the other hand, in a case where the user does not give an instruction on the end of the use of the VR content (S111: No), the server 10-1 repeats the processing after S107 again.

(2-2-1-1. First Display Control Processing for Lowering Immersion Degree: First Example)

Figure 12:
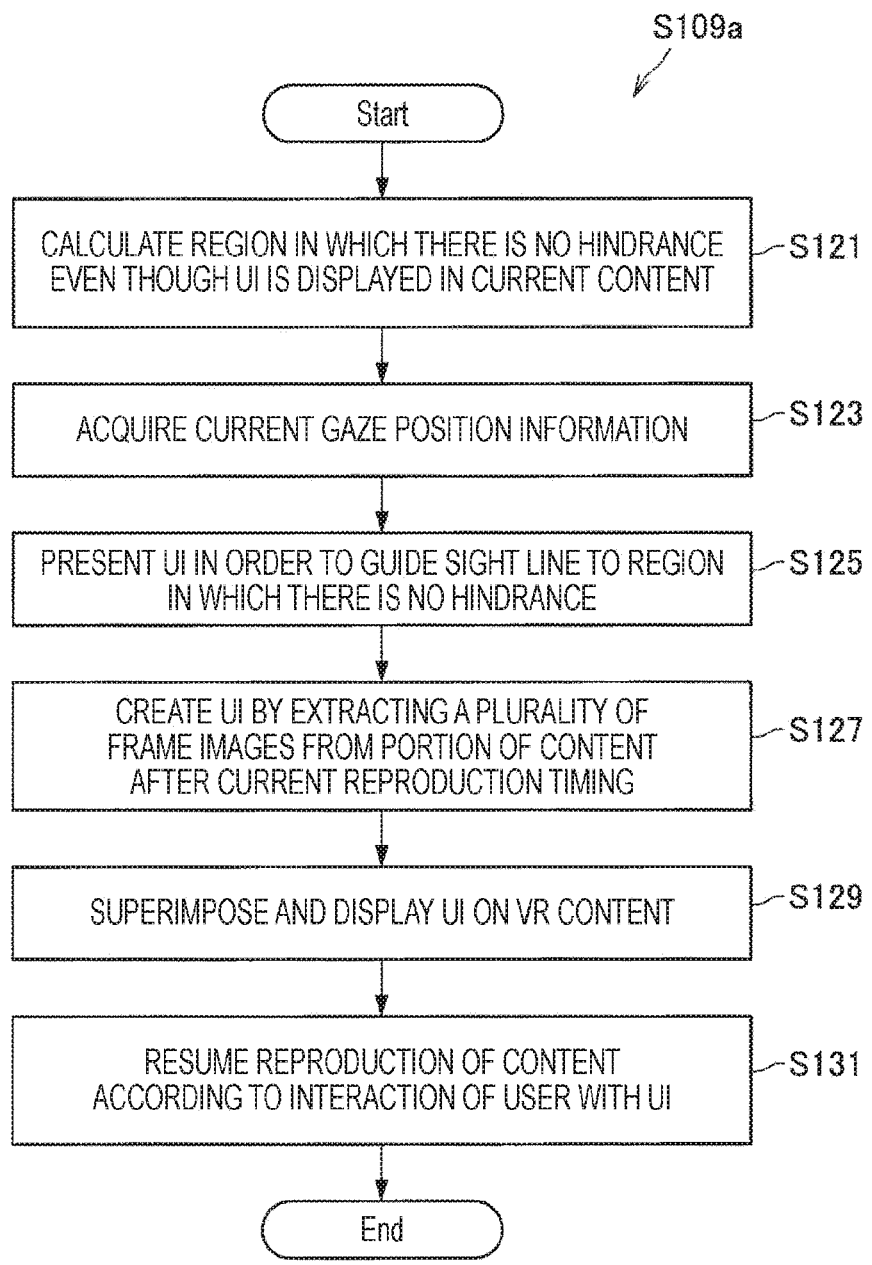
FIG. 12 is a flowchart illustrating a first example of a flow of "first display control processing for lowering an immersion degree" according to the first embodiment.

Here, a flow of a first example of the "first display control processing for lowering an immersion degree" in S109 will be described in detail with reference to FIG. 12. As illustrated in FIG. 12, first, the output control unit 106 calculates a region in which there is no hindrance in using the VR content even though the UI is displayed in the VR content at the current reproduction timing (S121).

Subsequently, the output control unit 106 receives and acquires a detection result of a position of a current gaze point of the user with respect to the display unit 224 from the client terminal 20 (S123).

Subsequently, the output control unit 106 causes a UI for guiding a sight line of the user to the region calculated in S121 to be superimposed and displayed on the VR content (S125).

Then, in a case where it is detected that the sight line of the user has moved according to the UI displayed in S125, the output control unit 106 extracts a plurality of frame images from a portion of the VR content after the current reproduction timing, and generates a UI including the plurality of frame images (S127).

Subsequently, the output control unit 106 causes the generated UI to be superimposed and displayed on the VR content (S129).

Thereafter, the output control unit 106 resumes the reproduction of the VR content according to an interaction of the user with the UI displayed in S129 (S131).

(2-2-1-2. First Display Control Processing for Lowering Immersion Degree: Second Example)

Figure 13:
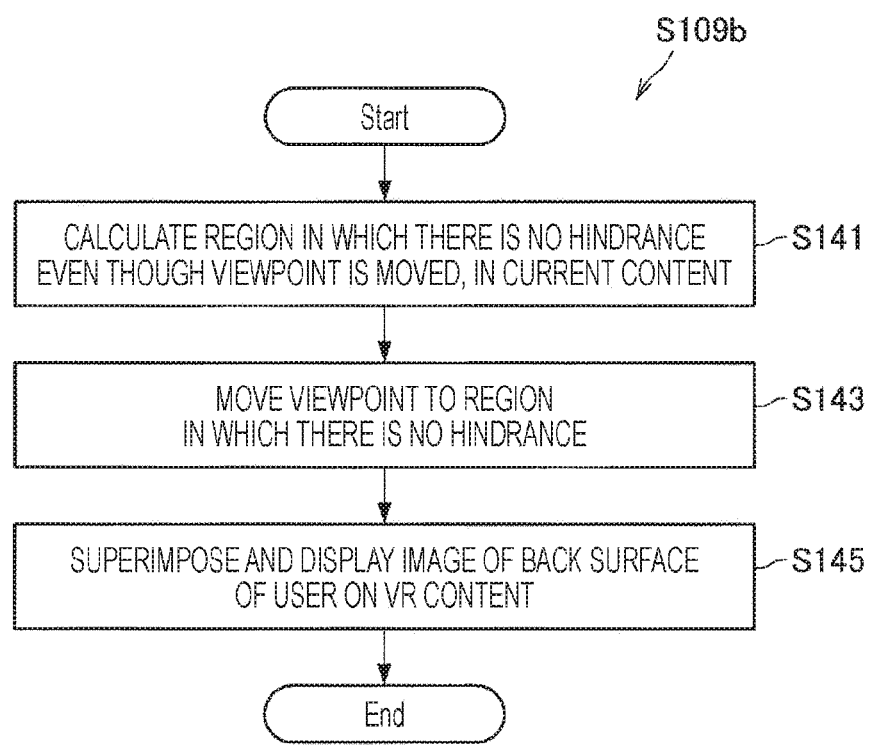
FIG. 13 is a flowchart illustrating a second example of a flow of "first display control processing for lowering an immersion degree" according to the first embodiment.

FIG. 13 is a flowchart illustrating a flow of a second example of the "first display control processing for lowering an immersion degree" in S109. Note that processing of S141 illustrated in FIG. 13 is similar to S121 illustrated in FIG. 12.

As illustrated in FIG. 13, after S141, the output control unit 106 moves a position of a current viewpoint in the VR content to a backward position at which it seems that there is no hindrance in using the VR content (S143).

Then, the output control unit 106 causes an image indicating a back surface of the user who is using the VR content to be superimposed and displayed on the VR content, in the vicinity of the position of the viewpoint before the movement (S145).

(2-2-2. Flow of Registration Processing of Excitement Information)

Next, a flow of "Registration Processing of Excitement Information" according to the first embodiment will be described in (2-2-2-1. Processing Example 1) to (2-2-2-6. Processing Example 6) with reference to FIGS. 14 to 20. Note that (2-2-2-1. Processing Example 1) to (2-2-2-4. Processing Example 4) are examples in which the excitement information is registered on the basis of a sensing result received from the client terminal 20. Furthermore, (2-2-2-5. Processing Example 5) and (2-2-2-6. Processing Example 6) are examples of registering the excitement information on the basis of an analysis result of information uploaded to an SNS or the like (regardless of when the VR content is used).

(2-2-2-1. Processing Example 1)

Figure 14:
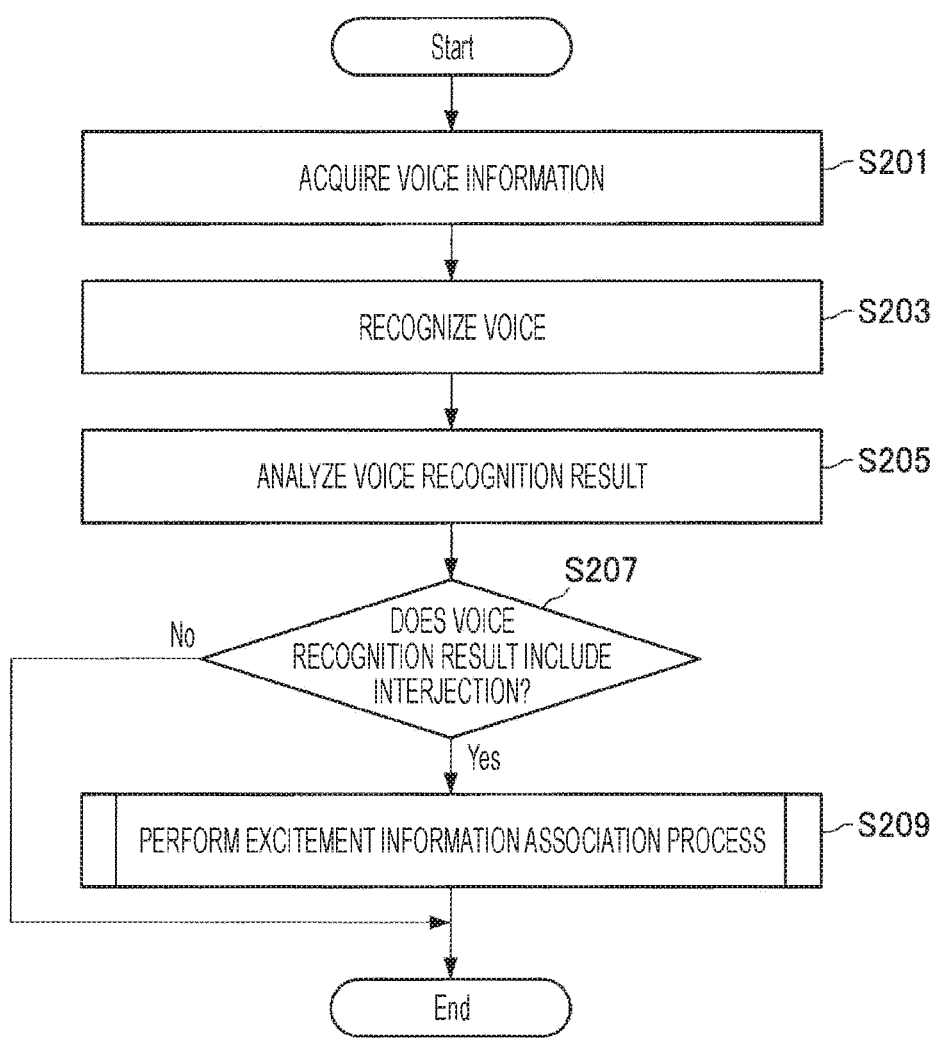
FIG. 14 is a flowchart illustrating a first example of a flow of "registration processing of excitement information" according to the first embodiment.

FIG. 14 is a flowchart illustrating a flow of a first example of the "registration processing of excitement information". As illustrated in FIG. 14, first, the information acquisition unit 102 of the server 10-1 acquires voice information regarding the collected user's voice received, from the client terminal 20 (S201).

Subsequently, the information acquisition unit 102 performs voice recognition on the acquired voice information (S203). Then, the information acquisition unit 102 analyzes morpheme information by performing natural language processing on a voice recognition result (S205).

Subsequently, the information acquisition unit 102 determines whether or not the voice recognition result includes an interjection on the basis of the analyzed morpheme information (S207). In a case where the voice recognition result does not include the interjection (S207: No), the "registration processing of excitement information" ends.

On the other hand, in the case where the voice recognition result includes the interjection (S207: Yes), the server 10-1 performs "excitement information association processing" as described later (S209).

Excitement Information Association Processing

Figure 15:
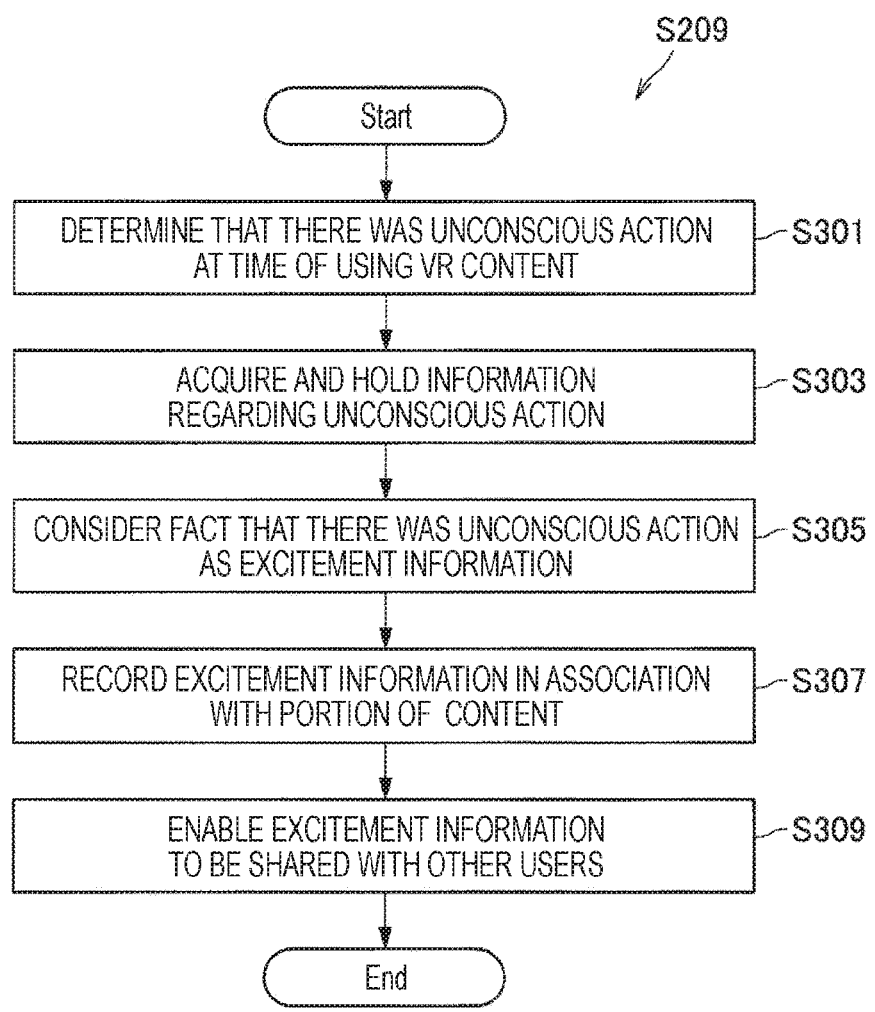
FIG. 15 is a flowchart illustrating a flow of "excitement information association processing" according to the first embodiment.

Here, a flow of the "excitement information association processing" in S209 will be described with reference to FIG. 15. As illustrated in FIG. 15, first, the information acquisition unit 102 determines that there was an unconscious action of the user at the time of performing the sensing (S301).

Subsequently, the information acquisition unit 102 acquires and holds information (for example, the sensing result) regarding the unconscious action (S303).

Subsequently, the information acquisition unit 102 considers that an excitement degree at the time of performing the sensing was a predetermined threshold value or more in a case where there was an unconscious action, and acquires excitement information indicating that the excitement degree was the predetermined threshold or more (S305).

Subsequently, the excitement information registration unit 104 registers the excitement information (or the excitement degree indicated by the excitement information) in association with a portion (for example, a reproduction timing, a reproduction scene, event information, a place in a virtual space corresponding to the VR content, or the like) of the VR content displayed at the time of performing the sensing, in the excitement information DB 124 (S307).

Thereafter, the control unit 100 enables the excitement information to be shared with other users, for example, the excitement information to be uploaded onto a predetermined sharing service (S309).

(2-2-2-2. Processing Example 2)

Figure 16:
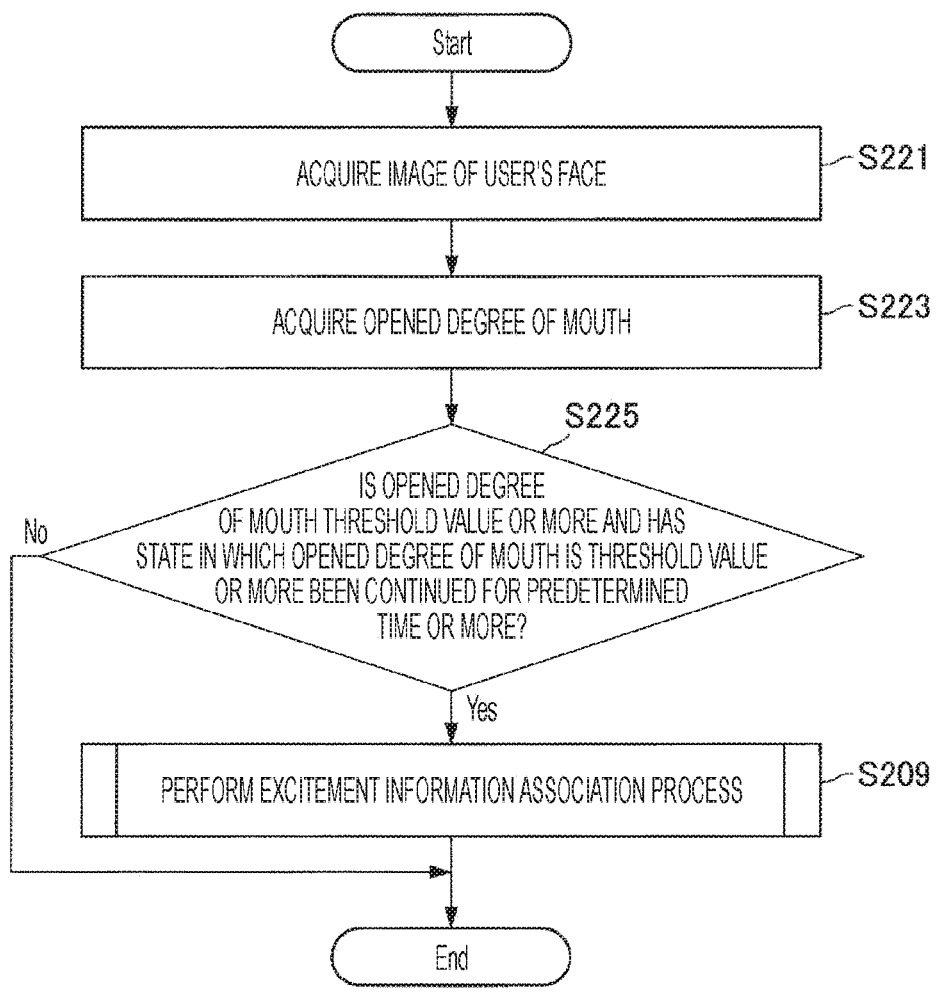
FIG. 16 is a flowchart illustrating a second example of a flow of "registration processing of excitement information" according to the first embodiment.

FIG. 16 is a flowchart illustrating a flow of a second example of the "registration processing of excitement information". As illustrated in FIG. 16, first, the information acquisition unit 102 of the server 10-1 acquires a captured moving image of a user's face received from the client terminal (S221).

Subsequently, the information acquisition unit 102 recognizes an opened degree of a user's mouth on the basis of the captured moving image of the user's face (S223).

Subsequently, the information acquisition unit 102 determines whether or not it has been recognized that the user's mouth is opened at a certain size or more and that a state where the user's mouth is opened at the certain size or more has been continued for a predetermined time or more (S225). In a case where the condition of S225 is not satisfied (S225: No), the "registration processing of excitement information" ends.

On the other hand, in a case where the condition of S225 is satisfied (S225: Yes), the server 10-1 performs the processing of S209 described above.

(2-2-2-3. Processing Example 3)

Figure 17:
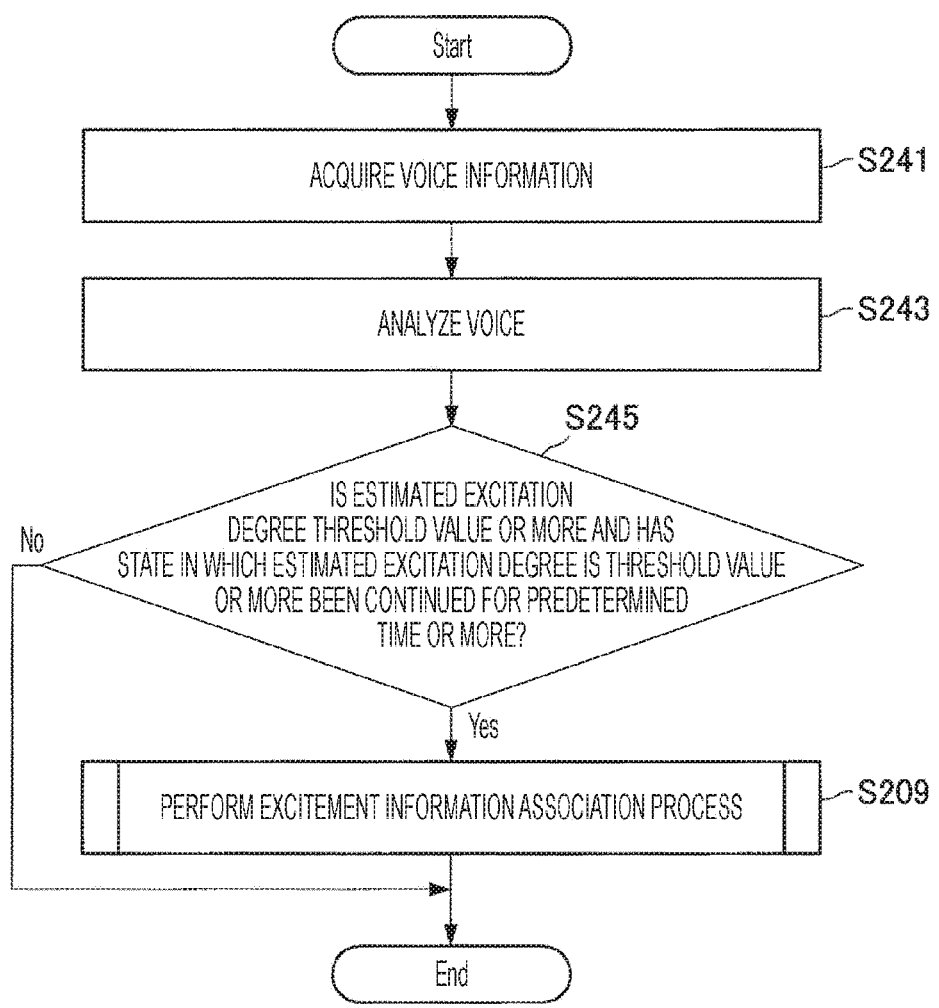
FIG. 17 is a flowchart illustrating a third example of a flow of "registration processing of excitement information" according to the first embodiment.

FIG. 17 is a flowchart illustrating a flow of a third example of the "registration processing of excitement information". As illustrated in FIG. 17, first, the information acquisition unit 102 of the server 10-1 acquires voice information regarding the collected user's voice, received from the client terminal 20 (S241).

Subsequently, the information acquisition unit 102 estimates an excitation degree of the user by analyzing the acquired voice information (S243).

Then, the information acquisition unit 102 determines whether or not the estimated excitation degree is a predetermined threshold value or more and a state where the estimated excitation degree is the predetermined threshold value or more has been continued for a predetermined time or more (S245). In a case where the condition of S245 is not satisfied (S245: No), the "registration processing of excitement information" ends.

On the other hand, in a case where the condition of S245 is satisfied (S245: Yes), the server 10-1 performs the processing of S209 described above.

(2-2-2-4. Processing Example 4)

Figure 18:
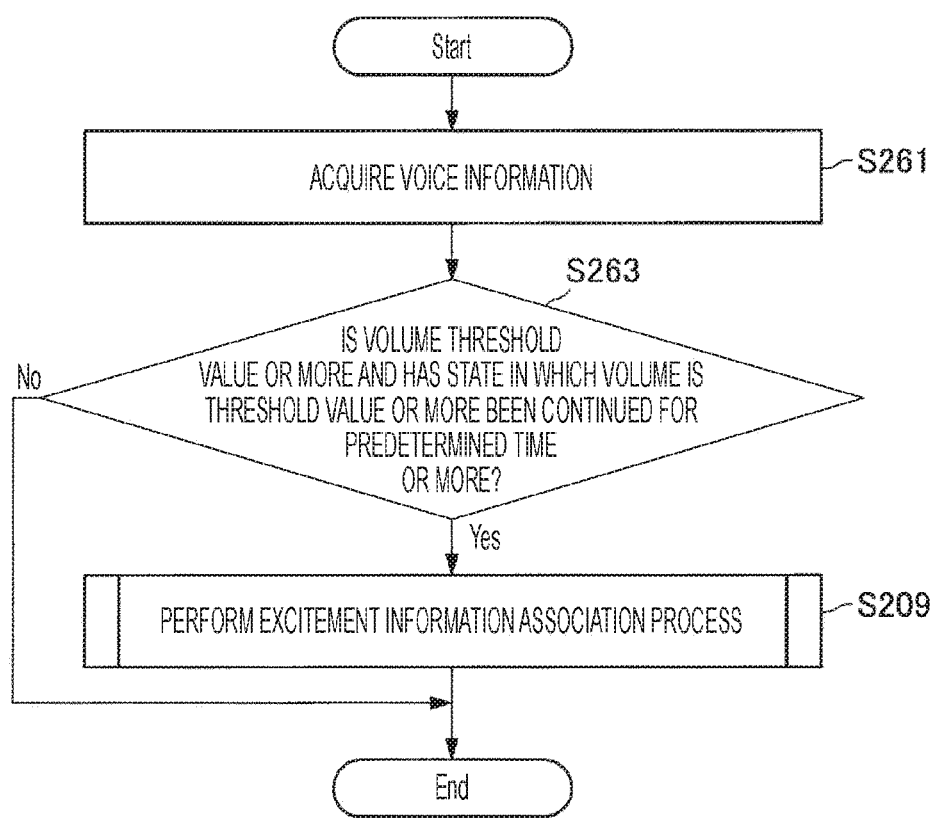
FIG. 18 is a flowchart illustrating a fourth example of a flow of "registration processing of excitement information" according to the first embodiment.

FIG. 18 is a flowchart illustrating a flow of a fourth example of the "registration processing of excitement information". As illustrated in FIG. 18, first, the information acquisition unit 102 of the server 10-1 acquires voice information regarding the collected user's voice, received from the client terminal 20 (S261).

Subsequently, the information acquisition unit 102 determines whether or not a volume specified from the acquired voice information is a predetermined threshold value or more and a state where the volume is the predetermined threshold value or more has been continued for a predetermined time or more (S263). In a case where the condition of S263 is not satisfied (S263: No), the "registration processing of excitement information" ends.

On the other hand, in a case where the condition of S263 is satisfied (S263: Yes), the server 10-1 performs the processing of S209 described above.

(2-2-2-5. Processing Example 5)

Figure 19:
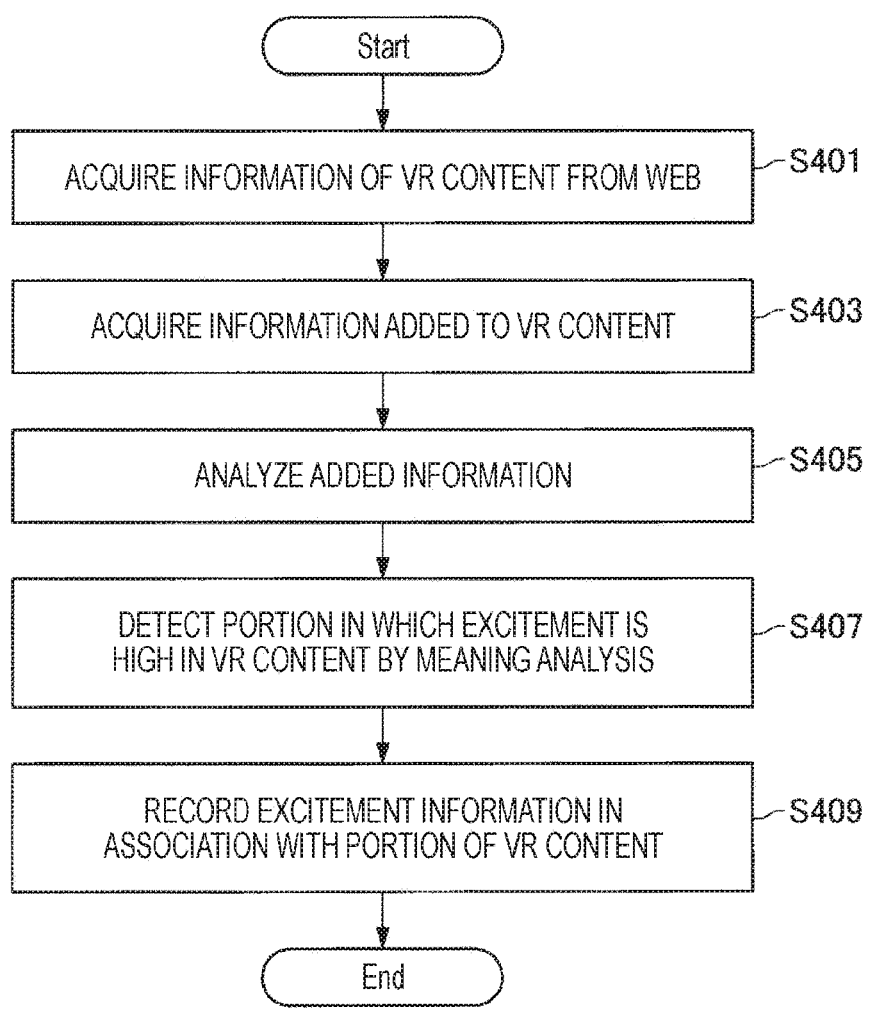
FIG. 19 is a flowchart illustrating a fifth example of a flow of "registration processing of excitement information" according to the first embodiment.

FIG. 19 is a flowchart illustrating a flow of a fifth example of the "registration processing of excitement information". As illustrated in FIG. 19, first, the information acquisition unit 102 of the server 10-1 searches for information regarding content information received from the client terminal 20 from an SNS or the like (S401).

Subsequently, the information acquisition unit 102 acquires information (message or the like) added (posted) to the VR content by one or more users on the basis of a search result (S403).

Subsequently, the information acquisition unit 102 analyzes the acquired added information by, for example, natural language processing or the like (S405).

Subsequently, the information acquisition unit 102 performs a semantic analysis on the added information to specify a portion in which an excitement in the VR content is high and an excitement degree in the portion, and acquires excitement information indicating a specified result (S407).

Thereafter, the excitement information registration unit 104 registers the excitement information (or the excitement degree indicated by the excitement information) in association with the detected portion in which the excitement is high, in the excitement information DB 124 (S409).

(2-2-2-6. Processing Example 6)

Figure 20:
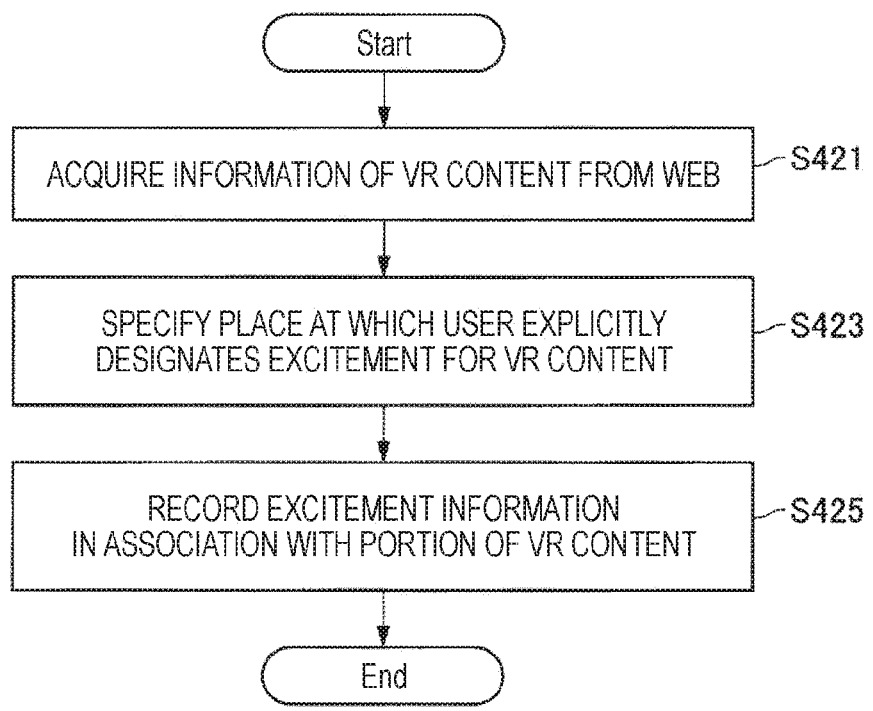
FIG. 20 is a flowchart illustrating a sixth example of a flow of "registration processing of excitement information" according to the first embodiment.

FIG. 20 is a flowchart illustrating a flow of a sixth example of the "registration processing of excitement information". As illustrated in FIG. 20, first, the information acquisition unit 102 of the server 10-1 searches for information regarding the VR content indicated by content information received from the client terminal 20 from an SNS or the like (S421).

Subsequently, the information acquisition unit 102 specifies a place at which the user explicitly designates excitement for the VR content and an excitation degree in the place on the basis of a search result. For example, the information acquisition unit 102 specifies a portion of the VR content corresponding to information on which a "Like!" button is clicked among the information regarding the VR content uploaded to the SNS or the like. Then, the information acquisition unit 102 acquires excitement information indicating a specified result (S423).

Thereafter, the excitement information registration unit 104 registers the excitement information (or the excitement degree indicated by the excitement information) in association with the specified portion in of the VR content in the excitement information DB 124 (S425).

(2-2-3. Modified Example)

Note that the "registration processing of excitement information" according to the first embodiment is not limited to the examples described above. For example, in (2-2-2-1. Processing Example 1) to (2-2-2-4. Processing Example 4), examples in which the excitement information is acquired on the basis of the sensing result of the voice have been described, but the "registration processing of excitement information" is not limited to such examples, and it is possible to acquire the excitement information by similar processing based on, for example, a sensing result of sight line information, biometric information, or physical information.

Furthermore, two or more of the flows of the processing of (2-2-2-1. Processing Example 1) to (2-2-2-6. Processing Example 6) may be executed in parallel or only one of these flows may be performed.

<2-3. Effect>

(2-3-1. Effect 1)

As described above, the server 10-1 according to the first embodiment acquires the excitement information regarding the use of the VR content, and performs the first display control for lowering an immersion degree of the user when the excitement degree indicated by the excitement information becomes larger than the predetermined threshold value during a period in which the VR content is displayed by the display unit 224. Therefore, it is possible to appropriately suppress the immersion degree of the user who is using the VR content.

For example, it is possible to prevent the user from being excessively immersed in the VR content while using (viewing/listening or the like) the VR content. Therefore, a possibility that the user will perform an unintended action while using the VR content is significantly reduced. As a result, the user can avoid troubling persons (for example, neighbors or the like) around him/her.

(2-3-2. Effect 2)

Furthermore, according to the first embodiment, it can be expected to suppress a use (viewing/listening or the like) time of the VR content. Then, it can be expected to prevent an occurrence of a health problem (for example, visual display terminal (VDT) syndrome or the like) during the use of VR content.

3. Second Embodiment

The first embodiment has been described hereinabove. Next, a second embodiment will be described. As described later, according to a second embodiment, in a case where it is detected that a user has performed an unconscious action while using a VR content, the user can be notified in a video of the VR content that he/she has performed the unconscious action. Note that, hereinafter, a description of contents similar to those of the first embodiment will be omitted and only contents different from those of the first embodiment will be described.

<3.1. Configuration>

Figure 21:
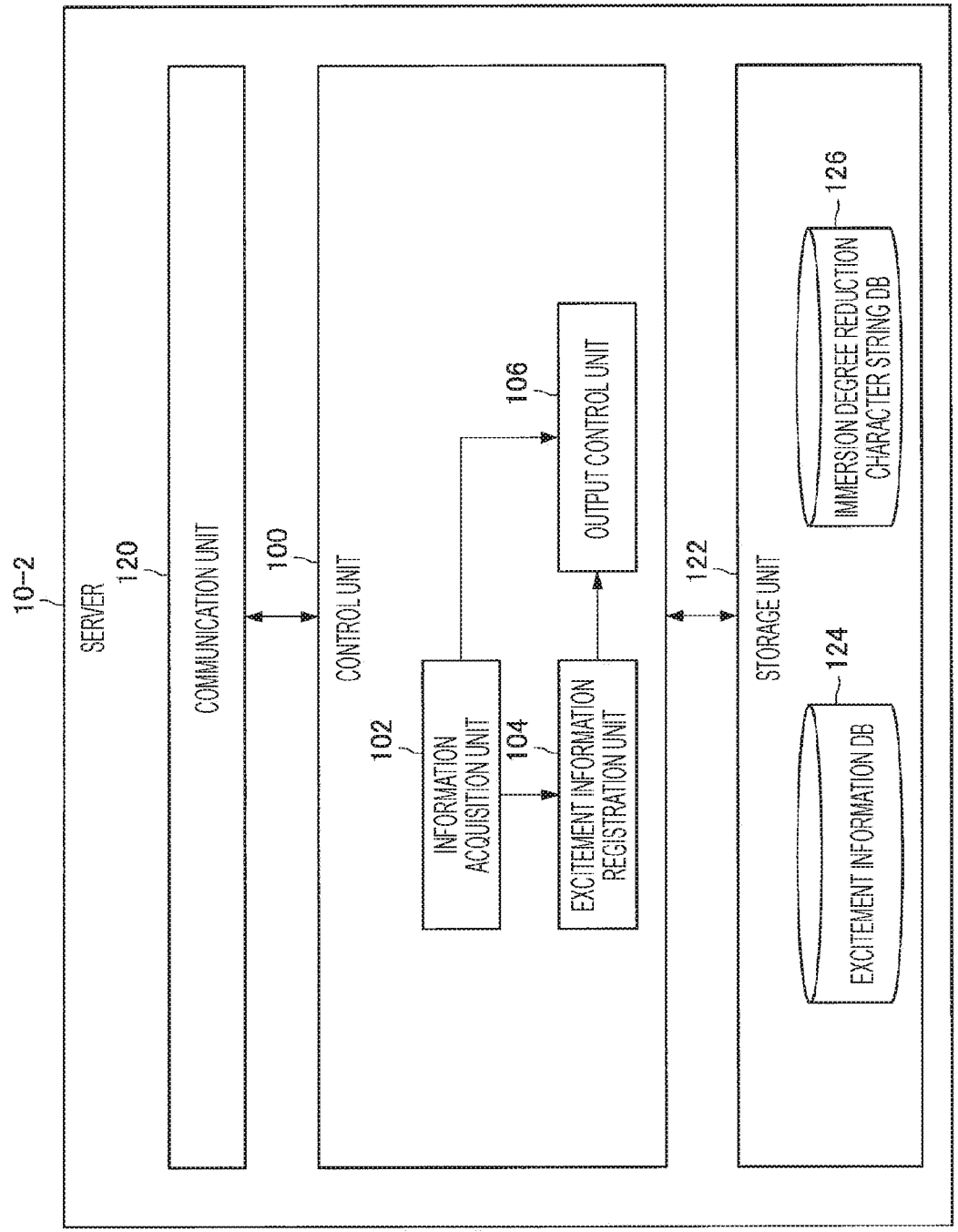
FIG. 21 is a functional block diagram illustrating a configuration example of a server 10-2 according to a second embodiment of the present disclosure.

First, a configuration according to a second embodiment will be described. FIG. 21 is a functional block diagram illustrating a configuration example of a server 10-2 according to the second embodiment. As illustrated in FIG. 21, components included in the server 10-2 are similar to those of the server 10-1 illustrated in FIG. 4.

(3-1-1. Output Control Unit 106)

For example, an output control unit 106 according to the second embodiment performs second display control for lowering an immersion degree of a user who is using a VR content on the basis of information regarding an action of the user acquired by an information acquisition unit 102, during a period in which the VR content is displayed by a display unit 224. For example, when it is detected that the user who is using the VR content has performed a predetermined action, the output control unit 106 performs the second display control for lowering an immersion degree. As an example, the output control unit 106 may perform the "second display control for lowering an immersion degree" when it is detected that the user who is using the VR content has performed the predetermined action, simultaneously with performing the "first display control for lowering an immersion degree" on the basis of the excitement information associated with the VR content (similarly to the first embodiment). Alternatively, the output control unit 106 may perform only the "second display control for lowering an immersion degree" without performing the "first display control for lowering an immersion degree".

(3-1-1-1. Display Example 1)

Figure 22:
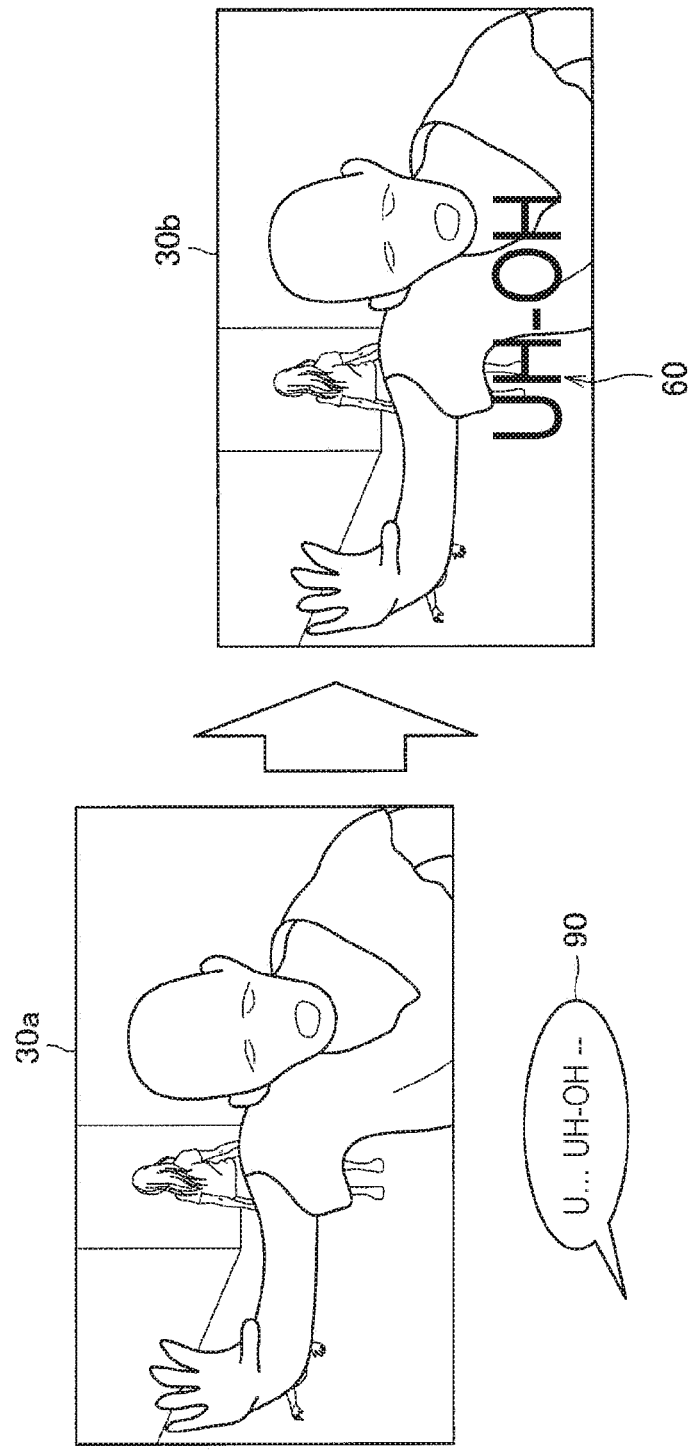
FIG. 22 is an explanatory diagram illustrating a first example of display control for lowering an immersion degree according to the second embodiment.

Hereinafter, a content of the "second display control for lowering an immersion degree" will be described in more detail. For example, when it is detected that the user has uttered, the output control unit 106 causes a predetermined character string to be superimposed and displayed on the VR content (as the "second display control for lowering an immersion degree"). Here, the above functions will be described in more detail with reference to FIG. 22. For example, it is assumed that it is detected that the user has made an (unconscious) utterance 90 as illustrated in FIG. 22 at a display timing of a video 30a illustrated in FIG. 22. In this case, the output control unit 106 may cause a character string corresponding to a voice recognition result of the utterance 90 to be superimposed and displayed on the VR content. For example, a control unit 100 (information acquisition unit 102) first performs voice recognition on the detected utterance 90, and performs natural language processing on the voice recognition result to determine whether or not the voice recognition result includes an interjection. Then, in a case where the voice recognition result includes the interjection, as in a video 30b illustrated in FIG. 22, the output control unit 106 causes a character string 60 corresponding to the voice recognition result to be superimposed and displayed on the video 30b in the vicinity of a gaze point of the user in the video 30b (or in the vicinity of the center of the video 30b). Note that the character string 60 may be the voice recognition result itself or may be only the interjection extracted from the voice recognition result. Furthermore, the output control unit 106 may increase a display size of the character string 60 as a volume of the utterance 90 becomes higher.

Furthermore, as a modified example, in a case where the volume of the utterance 90 is a predetermined threshold value or more, the output control unit 106 may cause any one of character strings registered in an immersion degree reduction character string DB 126 stored in, for example, a storage unit 122 to be superimposed and displayed on the VR content. For example, in an example illustrated in FIG. 22, in a case where it is detected that the volume of the utterance 90 is the predetermined threshold value or more (or has become the predetermined threshold or more), the output control unit 106 selects any one of the character strings from the immersion degree reduction character string DB 126, and causes the selected character string to be superimposed and displayed in the vicinity of the gaze point of the user in the video 30b (or in the vicinity of the center of the video 30b). Note that the output control unit 106 may increase a display size of the character string as the volume of the utterance 90 becomes higher.

Here, a plurality of character strings (interjection or the like) can be registered in advance in the immersion degree reduction character string DB 126. For example, the character string may be registered in association with user attribute information (an age, a gender or the like) in the immersion degree reduction character string DB 126. Note that the immersion degree reduction character string DB 126 may be stored in the storage unit 122 or may be stored in another device with which a server 10 can communicate through a communication network 22.

According to the above display example, when the user makes the unconscious utterance, the character string such as, for example, the voice recognition result of the utterance is presented to the user. Therefore, it is possible to notify the user that the user has uttered (and notify the user of a word actually uttered by the user). Furthermore, usually, visual information tends to be easier for the user to return to himself/herself than sound information, and it is thus possible to significantly reduce the immersion degree of the user by the display example.

(3-1-1-2. Display Example 2)

Furthermore, when a specific behavior of the user is detected, the output control unit 106 can move a position of a current viewpoint in the VR content backward with respect to a direction of the viewpoint (as the second display control for lowering an immersion degree). Here, the specific behavior is, for example, a bending-back motion. Furthermore, the specific behavior can be, for example, a motion in which a steepness degree of motion of a body such as a head is a predetermined threshold or more.

Here, the above functions will be described in more detail with reference to FIG. 23. For example, it is assumed that it is detected that the steepness degree of the motion of the head of the user is a predetermined threshold or more, at a display timing of a video 30a illustrated in FIG. 23. In this case, first, the control unit 100 (information acquisition unit 102) acquires motion information of the user at the time of the detection on the basis of, for example, a captured image of the user at the time of the detection or a measurement result of acceleration, received from a client terminal 20. Next, the output control unit 106 generates an animation 64 in which a virtual object corresponding to the user moves according to the acquired motion information. Next, the output control unit 106 forcibly moves a position of a current viewpoint in the VR content backward by, for example, a predetermined distance (5 steps or the like) with respect to a direction of the viewpoint. For example, the output control unit 106 moves the position of the current viewpoint to a backward position at which it seems that there is no hindrance in using the VR content. Therefore, as in a video 30b illustrated in FIG. 23, the video 30b of the VR content from the position of the viewpoint after the movement is displayed on the display unit 224.

Figure 23:
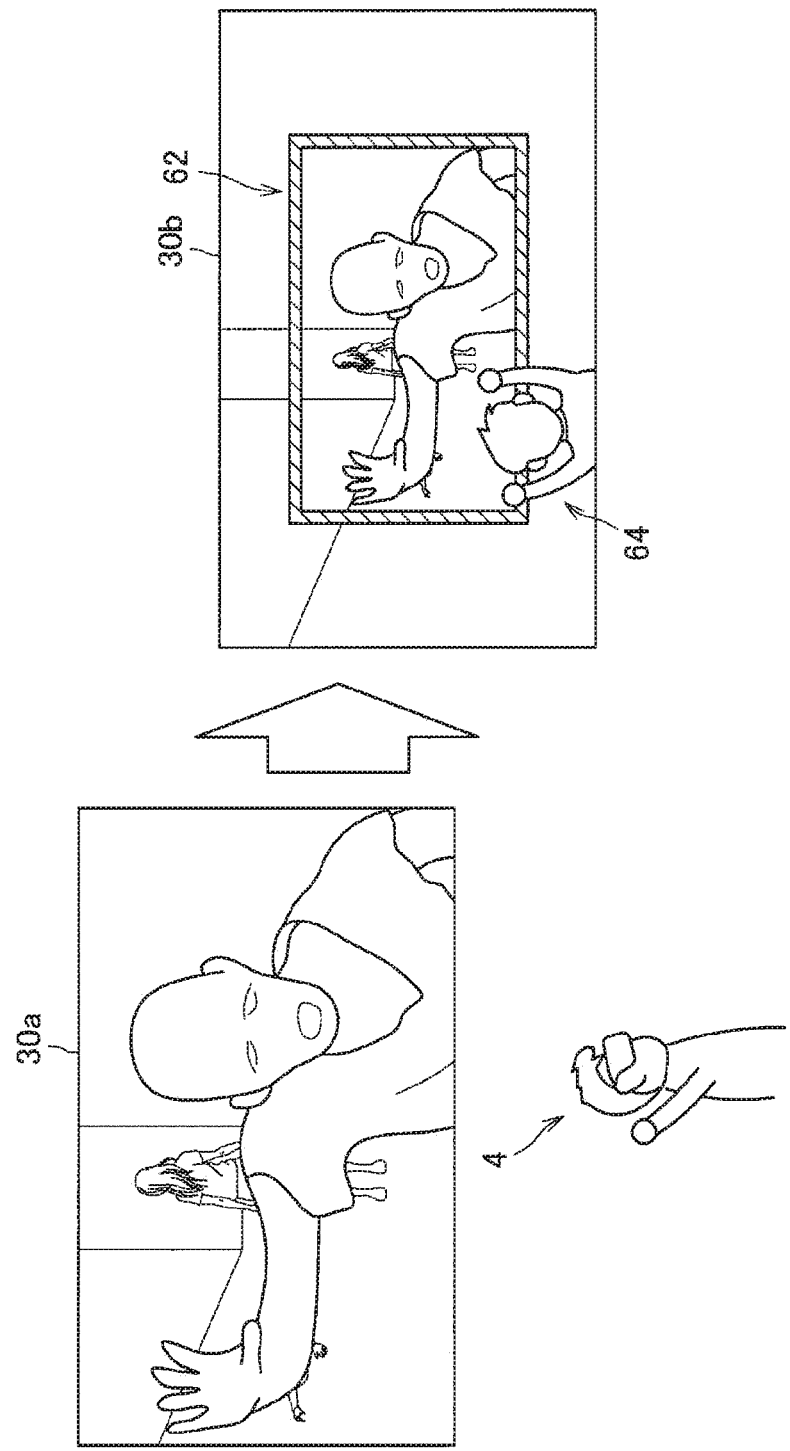
FIG. 23 is an explanatory diagram illustrating a second example of display control for lowering an immersion degree according to the second embodiment.

Moreover, the output control unit 106 causes the generated animation 64 to be superimposed and displayed on the video 30b in the vicinity of the position of the viewpoint before the movement, as illustrated in FIG. 23. According to the above display example, it is possible to display the animation 64 reproducing (simulating) the motion (bending-back motion or the like) of the user at the display timing of the video 30a simultaneously with forcibly moving the viewpoint to a position at which the position of the viewpoint before the movement can be looked down. Therefore, the motion of the user at the display timing of the video 30a can be visually presented to the user, and thus, the user can return to himself/herself (that is, the immersion degree of the user can be reduced).

Note that the output control unit 106 can return the position of the viewpoint to the position of the viewpoint before the movement at a timing at which the animation 64 ends.

(3-1-1-3. Display Example 3)

Alternatively, when the specific behavior of the user is detected, the output control unit 106 can reduce a display size of the VR content on the display unit 224 (as the "second display control for lowering an immersion degree").

Figure 24:
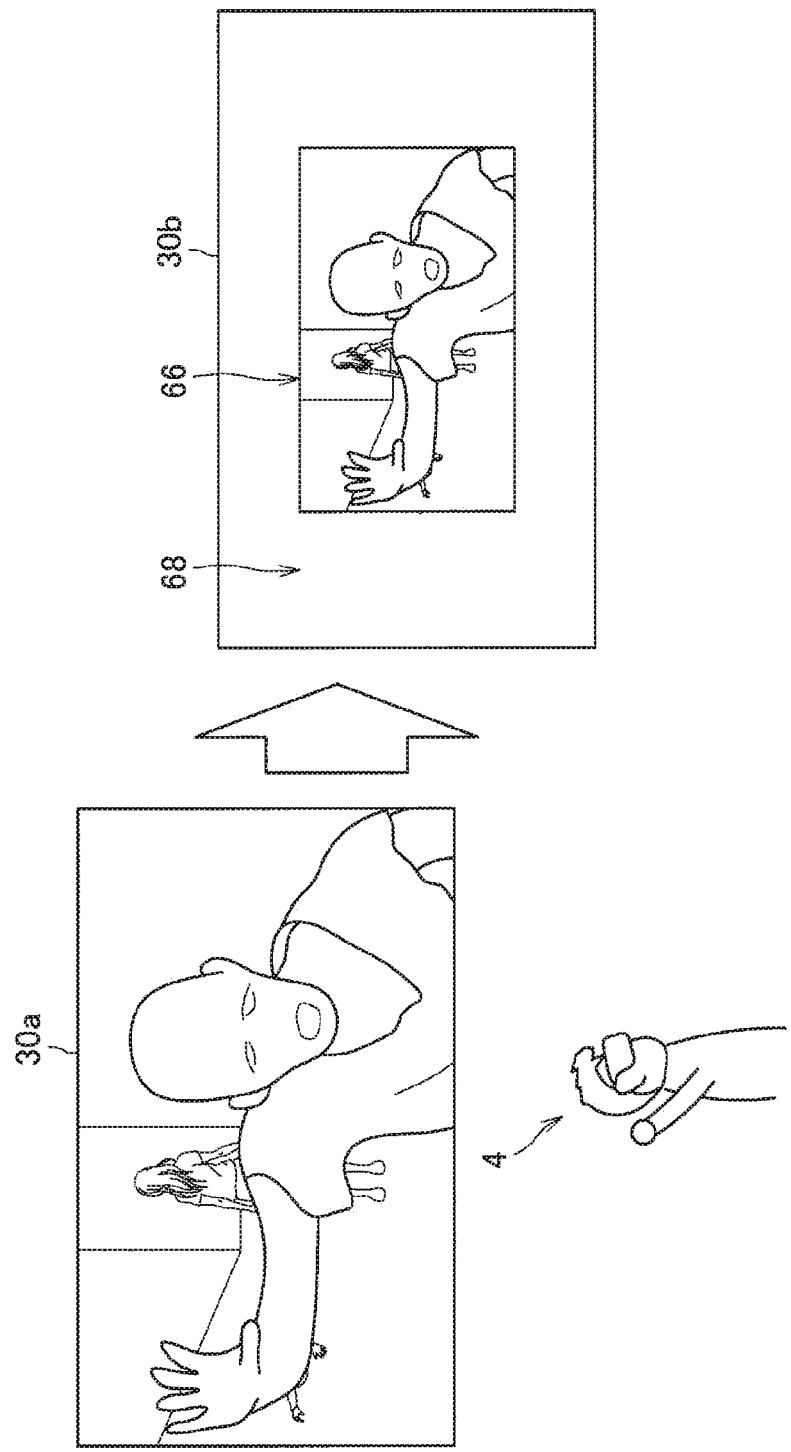
FIG. 24 is an explanatory diagram illustrating a third example of display control for lowering an immersion degree according to the second embodiment.

Here, the above functions will be described in more detail with reference to FIG. 24. For example, it is assumed that it is detected that the steepness degree of the motion of the head of the user is a predetermined threshold or more, at a display timing of a video 30a illustrated in FIG. 24. In this case, the output control unit 106 reduces a display size of a video 66 of the VR content and causes the display unit 224 to display the reduced display size, as illustrated in a video 30b, and causes a display region 68 around the video 66 in the display unit 224 to be displayed in a predetermined color (for example, black or the like).

Therefore, the user can be given unexpectedness, and it can thus be expected that the immersion degree of the user will be lowered.

<3-2. Flow of Processing>
(3-2-1. Overall Flow of Processing)

The configuration according to the second embodiment has been described. Next, a flow of processing according to the second embodiment will be described with reference to FIGS. 25 to 27.

Figure 25:
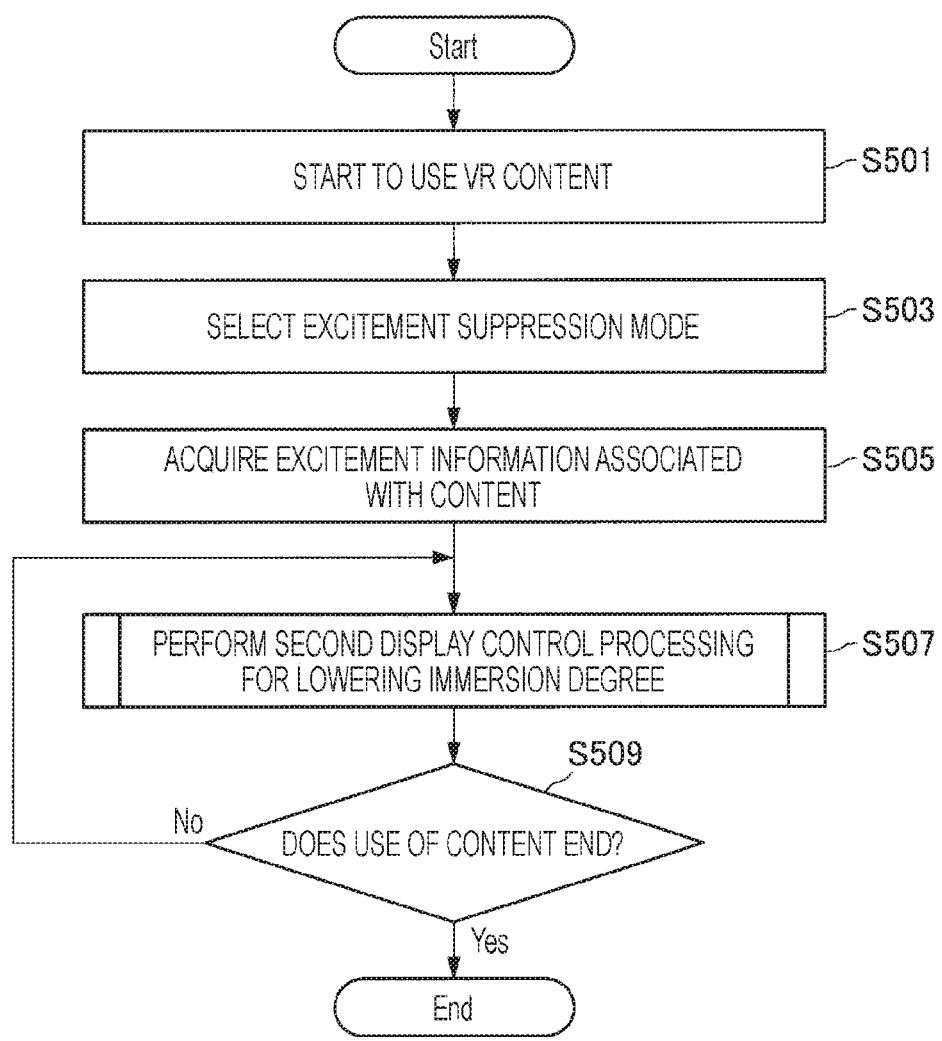
FIG. 25 is a flowchart illustrating the overall flow of processing according to the second embodiment.

FIG. 25 is a flowchart illustrating the overall flow of processing according to the second embodiment. Note that processing of S501 to S505 illustrated in FIG. 25 is similar to that of S101 to S105 according to the first embodiment (shown in FIG. 11).

After S505, the server 10-2 performs "second display control processing for lowering an immersion degree" as described later (S507).

Thereafter, in a case where the user gives an instruction on the end of the use of the VR content (S509: Yes), the flow of the processing ends. On the other hand, in a case where the user does not give an instruction on the end of the use of the VR content (S509: No), the server 10-2 repeats the processing after S507 again.

(3-2-1-1. Modified Example)

Note that the overall flow of the processing is not limited to the example illustrated in FIG. 25. The server 10-2 may perform the processing of S109 according to the first embodiment (illustrated in FIG. 11) (that is, the "first display control processing for lowering an immersion degree"), for example, between S505 and S507.

(3-2-2. Second Display Control Processing for Lowering Immersion Degree: First Example)

Figure 26:
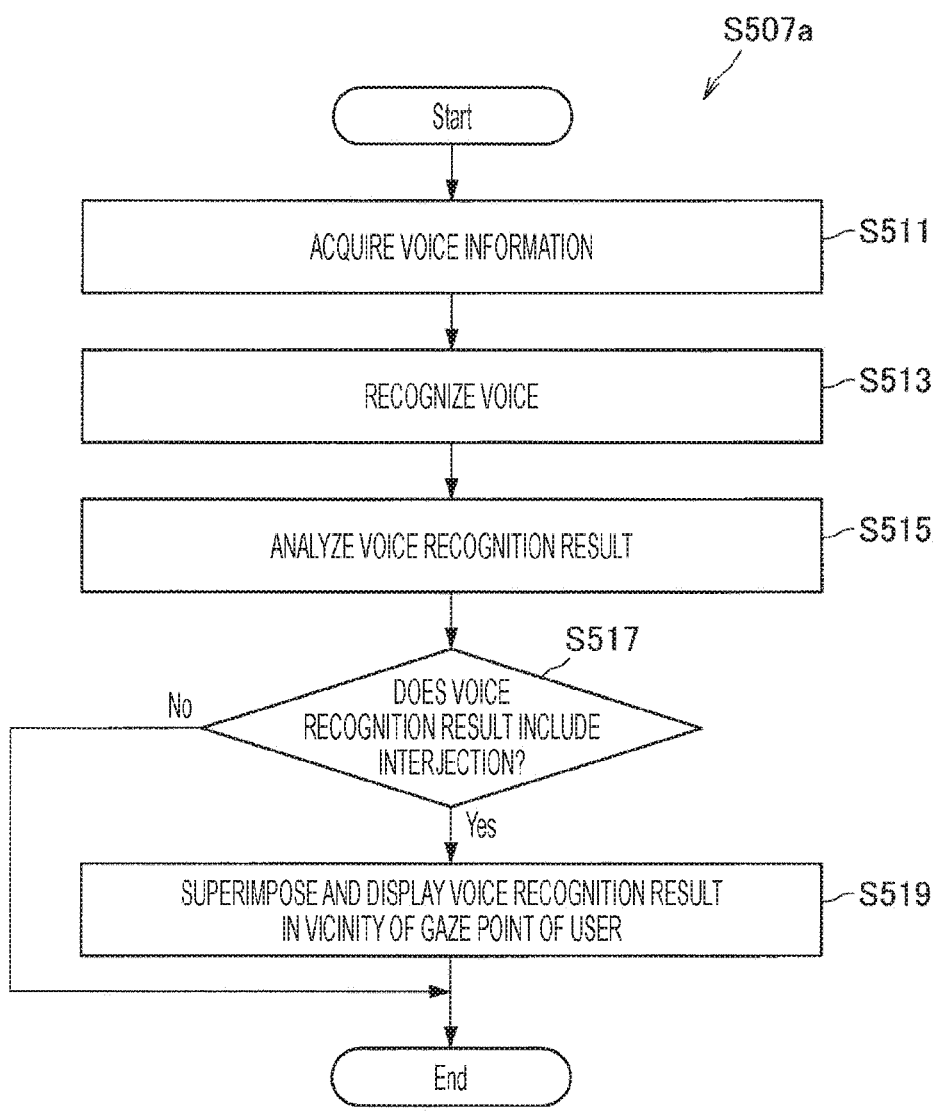
FIG. 26 is a flowchart illustrating a first example of "second display control processing for lowering an immersion degree" according to the second embodiment.

Here, a flow of the "second display control processing for lowering an immersion degree" in S507 will be described in detail with reference to FIGS. 26 and 27. FIG. 26 is a flowchart illustrating a flow of a first example of the "second display control processing for lowering an immersion degree". As illustrated in FIG. 26, first, the information acquisition unit 102 of the server 10-2 acquires voice information regarding a current collected user's voice, received from the client terminal 20 (S511).

Subsequently, the information acquisition unit 102 performs voice recognition on the acquired voice information (S513). Then, the information acquisition unit 102 analyzes morpheme information by performing natural language processing on a voice recognition result (S515).

Subsequently, the information acquisition unit 102 determines whether or not the voice recognition result includes an interjection on the basis of the analyzed morpheme information (S517). In a case where the voice recognition result does not include the interjection (S517: No), the "second display control processing for lowering an immersion degree" ends.

On the other hand, in a case where the voice recognition result includes the interjection (S517: Yes), the output control unit 106 causes a character string according to the voice recognition result to be superimposed and displayed in the vicinity of a gaze point of the user in the VR content (S519).

(3-2-3. Second Display Control Processing for Lowering Immersion Degree: Second Example)

Figure 27:
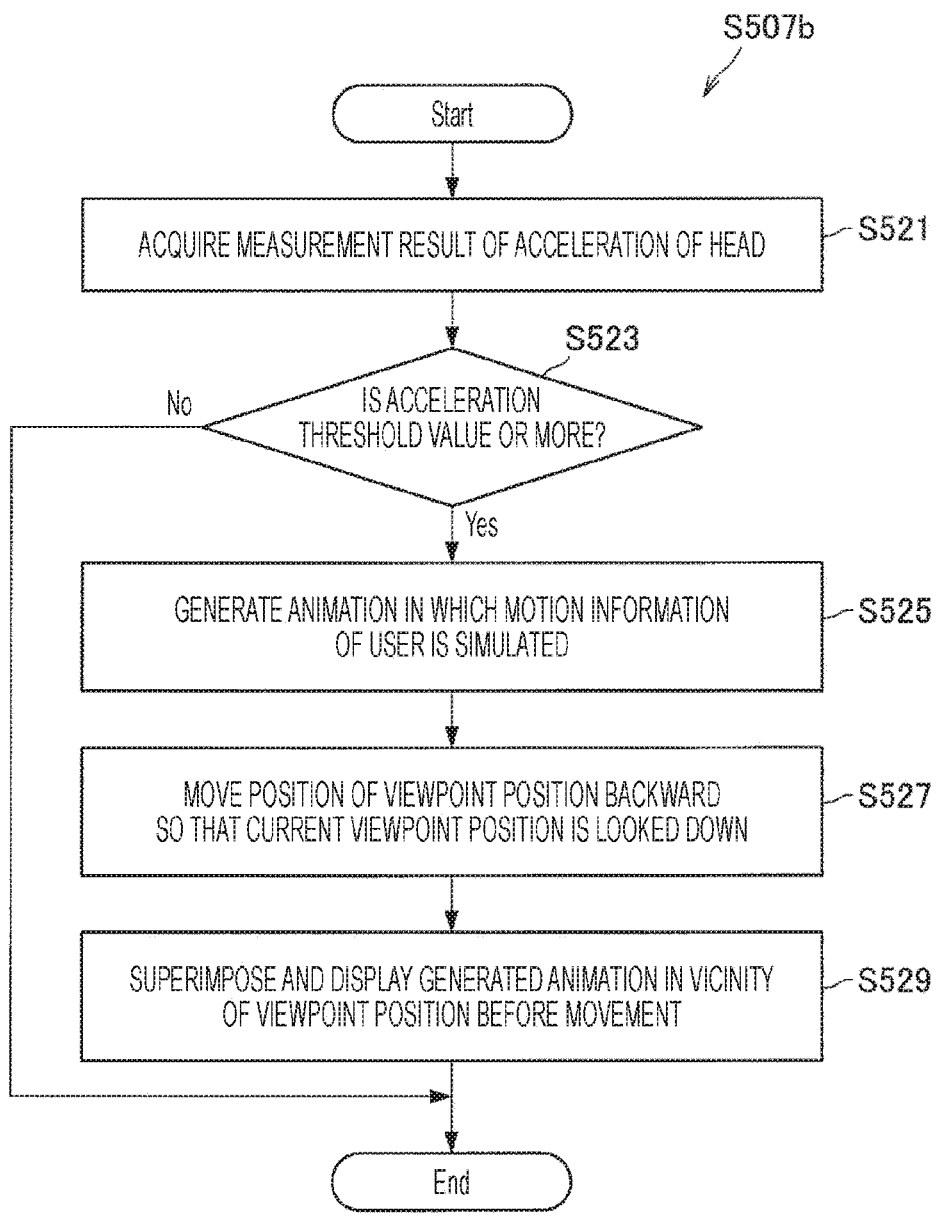
FIG. 27 is a flowchart illustrating a second example of "second display control processing for lowering an immersion degree" according to the second embodiment.

Furthermore, FIG. 27 is a flowchart illustrating a flow of a second example of the "second display control processing for lowering an immersion degree" in S507. As illustrated in FIG. 27, first, the information acquisition unit 102 of the server 10-2 acquires a sensing result of a current acceleration of the head of the user received from the client terminal 20 (S521).

Subsequently, the output control unit 106 determines whether or not the sensed acceleration is a predetermined threshold value or more (S523). In a case where the sensed acceleration is less than the predetermined threshold value (S523: No), the "second display control processing for lowering an immersion degree" ends.

On the other hand, in a case where the sensed acceleration is the predetermined threshold value or more (S523: Yes), the output control unit 106 first acquires motion information of the user at the time of performing the sensing on the basis of, for example, a captured image of the user at the time of performing the sensing, a measurement result of the acceleration, or the like, received from the client terminal 20. Then, the output control unit 106 generates a moving animation so that a virtual object corresponding to the user simulates the acquired motion information (S525).

Subsequently, the output control unit 106 forcibly moves the position of the viewpoint backward with respect to the direction of the viewpoint so that the position of the current viewpoint in the VR content can be looked down (S527). Then, the output control unit 106 causes the animation generated in S525 to be superimposed and displayed on the VR content in the vicinity of the position of the viewpoint before the movement (S529).

<3-3. Effect>

As described above, the server 10-2 according to the second embodiment performs the second display control for lowering an immersion degree of a user who is using the VR content when it is detected that the user has performed the predetermined action, during a period in which the VR content is displayed by the display unit 224. Therefore, it is possible to appropriately suppress the immersion degree of the user who is using the VR content.

For example, when it is detected that the user has performed the unconscious action (an utterance, bending himself/herself back, or the like) while using the VR content, the server 10-2 can notify the user in a video of the VR content that the user has performed the unconscious action. As a result, it can be expected that the user returns to himself/herself. Furthermore, subsequently, the user can avoid continuously performing a similar action.

<<4. Hardware Configuration>>

Figure 28:
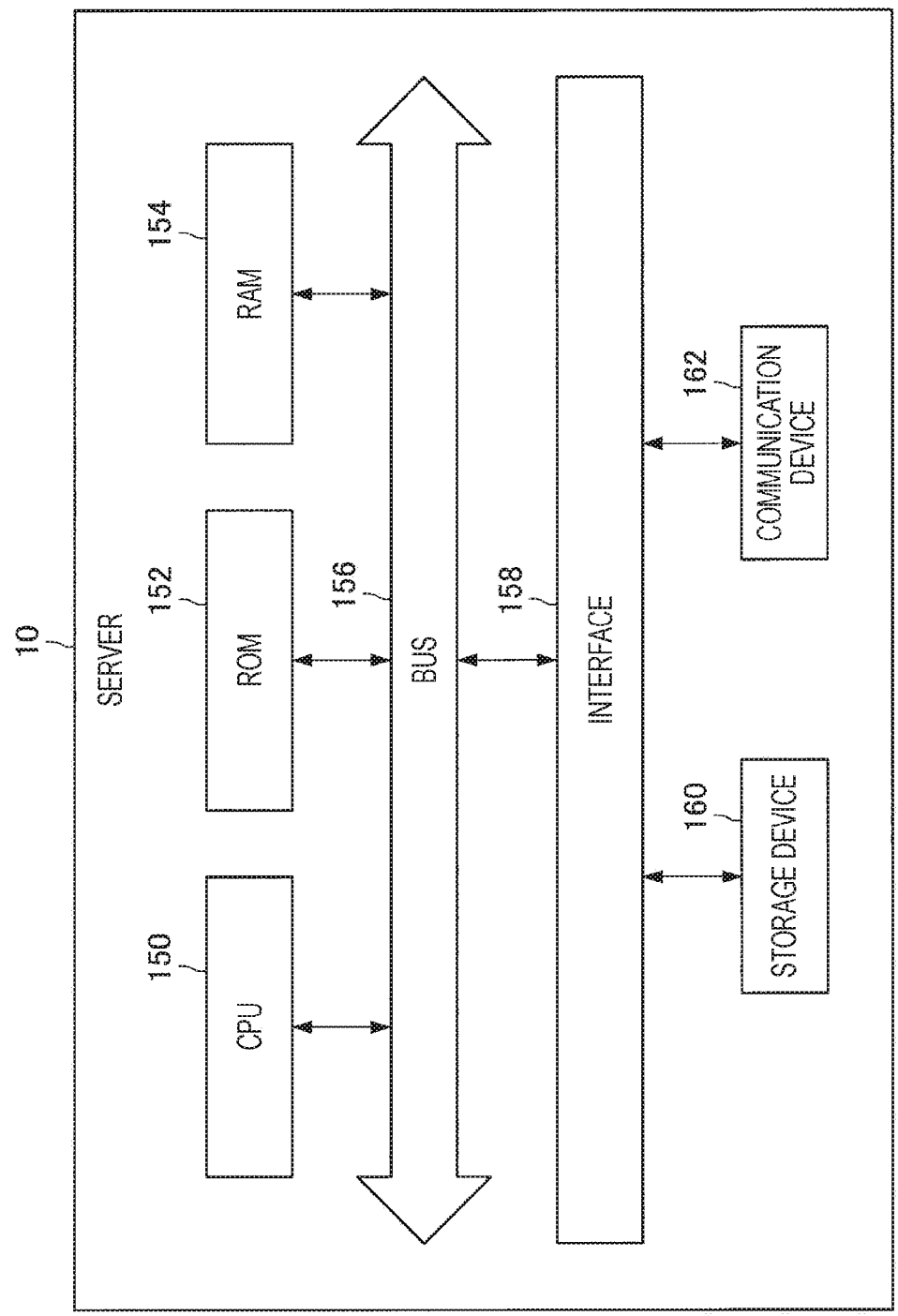
FIG. 28 is an explanatory diagram illustrating a hardware configuration example of a server 10 common to each embodiment.

Next, a hardware configuration of the server 10 common to each embodiment will be described with reference to FIG. 28. As illustrated in FIG. 28, the server 10 includes a CPU 150, a read only memory (ROM) 152, a RAM 154, a bus 156, an interface 158, a storage device 160, and a communication device 162.

The CPU 150 functions as an arithmetic processing device and a control device, and generally controls an operation in the server 10 according to various programs. Furthermore, the CPU 150 realizes a function of the control unit 100 in the server 10. Note that the CPU 150 includes a processor such as a microprocessor.

The ROM 152 stores control data or the like such as a program, or an operation parameter used by the CPU 150.

The RAM 154 temporarily stores, for example, a program executed by the CPU 150, data in use, or the like.

The bus 156 includes a CPU bus or the like. The bus 156 connects the CPU 150, the ROM 152, and the RAM 154 to each other.

The interface 158 connects the storage device 160 and the communication device 162 to the bus 156.

The storage device 160 is a device for storing data, which functions as the storage unit 122. The storage device 160 includes, for example, a storage medium, a recording device recording data in the storage medium, a reading device reading data from the storage medium, a deleting device deleting data recorded in the storage medium, or the like.

The communication device 162 is a communication interface including a communication device (for example, a network card or the like) or the like for being connected to, for example, the communication network 22 or the like. Furthermore, the communication device 162 may be a wireless LAN compatible communication device, a long term evolution (LTE) compatible communication device, or a wire communication device performing wired communication. The communication device 162 functions as the communication unit 120.

<<5. Modified Example>>

Hereinabove, the preferred embodiments of the present disclosure have been described in detail with reference to the accompanying drawings, but the present disclosure is not limited to such embodiments. It is apparent to those skilled in the art to which the present disclosure belongs that various modifications or alterations can be conceived within the scope of the technical idea described in the claims, and it is naturally understood that these modifications or alterations also fall within the technical scope of the present disclosure.

<5-1. Modified Example 1>

For example, the server 10 (output control unit 106) may detect a portion in which asthenopia can occur in the VR content that is being used by the user on the basis of the excitement information acquired by the information acquisition unit 102, and perform the "display control for lowering an immersion degree" described above on the detected portion in which the asthenopia can occur. For example, when the portion in which the asthenopia can occur in the VR content is detected, the server 10 forcibly moves a viewpoint position backward. According to this modified example, a concentration degree of the user (related to the use of the VR content) is suppressed in the portion in which the asthenopia can occur. As a result, it can be expected that the user rests his/her eyes, for example, stops the use of the VR content, and it can thus be expected to prevent the occurrence of the asthenopia.

<5-2. Modified Example 2>

Furthermore, as another modified example, the server 10 (output control unit 106) may also perform the "display control for lowering an immersion degree" described above when it detects that notification has occurred in the outside world (real space) (for example, another person speaks to the user who is using VR content, a telephone call of the user is received, or the like). According to this modified example, the user easily recognizes the occurrence of the notification even while using the VR content.

<5-3. Modified Example 3>

Furthermore, as still another modified example, the server (output control unit 106) may also dynamically change whether or not to perform the "display control for lowering an immersion degree" on the basis of attribute information of the user who is using the VR content. For example, in a case where the user is a child, the server 10 forcibly performs the "display control for lowering an immersion degree" (as in each embodiment). Furthermore, in a case where the user is an adult, the server 10 may not perform the "display control for lowering an immersion degree"

<5-4. Modified Example 4>

Furthermore, as still another modified example, the server (output control unit 106) may also dynamically change whether or not to perform the "display control for lowering an immersion degree" on the basis of a use time zone of the VR content. For example, in a case where the use time zone is "night", the server 10 forcibly performs the "display control for lowering an immersion degree" (as in each embodiment described above). Furthermore, in a case where the use time zone is "daytime", the server 10 may not perform the "display control for lowering an immersion degree". Therefore, the user can enjoy the VR content while preventing the other persons (for example, the neighbors or the like) from being troubled.

<5-5. Modified Example 5>

Furthermore, as yet still another modified example, the server 10 (output control unit 106) may control an output of a voice so that an environmental sound of the outside world (real space in which the user is positioned) is heard by the user, simultaneously with performing the "display control for lowering an immersion degree". For example, when it is detected that the user who is using the VR content has performed a predetermined action (as described above in the second embodiment), the server (output control unit 106) may reduce a volume of the VR content so that the environmental sound of the outside world (real space in which the user is positioned) is heard by the user, simultaneously with performing the "display control for lowering an immersion degree". According to this modified example, it can be expected to further lower the immersion degree of the user. That is, the user can more easily return to himself/herself.

<5-6. Modified Example 6>

Furthermore, an example in which the display unit 224 is a head mounted device has been described in each embodiment described above, but the present disclosure is not limited to such an example. For example, the display unit 224 may be a stationary display. Note that the stationary display may include, for example, an LCD, an OLED or the like. Furthermore, the display unit 224 may be installed on a wall surface and a ceiling in a dedicated dome-shaped facility. In this case, the user can use a VR content in the facility.

Alternatively, the display unit 224 may be a three-dimensional (3D) projector, and a video may be projected on a projection target (for example, a wall, a screen, or the like of a room 2) by the 3D projector.

<5-7. Modified Example 7>

Furthermore, an example in which the information processing device in the present disclosure is the server 10 has been described in each embodiment described above, but the present disclosure is not limited to such an example. For example, the information processing device may be a general-purpose personal computer (PC), a tablet terminal, a game machine, a mobile phone such as a smartphone, a portable music player, a wearable device such as an HMD, for example, a robot, or the like.

<5-8. Modified Example 8>

Furthermore, as yet still another modified example, the information acquisition unit 102 and the output control unit 106 may be included in the client terminal 20 instead of being included in the server 10. In this case, the information processing device in the present disclosure may be the client terminal 20.

<5-9. Modified Example 9>

Furthermore, the respective steps in the flow of the processing according to each embodiment described above may not necessarily be processed in the order mentioned. For example, the respective steps may be processed in an appropriately changed order. Furthermore, the respective steps are not processed in time series, and some of the respective steps may be processed in parallel or individually. Furthermore, some of the steps mentioned may be omitted or other steps may be further added.

Furthermore, according to each embodiment described above, a computer program for causing hardware such as the CPU 150, the ROM 152, the RAM 154, and the like, to exert the same function as that of each configuration of the server 10 according to each embodiment described above can also be provided. Furthermore, a recording medium on which the computer program is recorded is also provided.

Furthermore, the effects described in the present specification are only illustrative or exemplary rather than being restrictive. That is, the technology according to the present disclosure can accomplish other effects apparent to those skilled in the art from the description of the present specification, in addition to or instead of the effects described above.

Note that the following configurations also fall within the technical scope of the present disclosure.

(1)
An information processing device including:
an acquisition unit that acquires excitement information regarding use of a virtual reality content or information regarding an action of a first user who is using the content; and
an output control unit that performs display control for lowering an immersion degree of the first user on the basis of the excitement information or the information regarding the action of the first user during a period in which the content is displayed by a display unit.

(2)
The information processing device according to the above (1), in which the output control unit performs the display control for lowering an immersion degree when an excitement degree indicated by the excitement information becomes larger than a first threshold value or when it is detected that the first user has performed a predetermined action, during the period in which the content is displayed.

(3)
The information processing device according to the above (2), in which the display control for lowering an immersion degree includes moving a position of a current viewpoint in the content backward with respect to a direction of the viewpoint.

(4)
The information processing device according to the above (3), in which the display control for lowering an immersion degree further includes causing an image indicating a back surface of the first user to be superimposed and displayed on the content in the vicinity of the position of the viewpoint before the movement.

(5)
The information processing device according to the above (3), in which the predetermined action is an action in which a steepness degree of motion of the first user is a second threshold value or more,
the information regarding the action of the first user includes motion information of the first user, and
the display control for lowering an immersion degree further includes causing an animation in which a virtual object corresponding to the first user moves according to the motion information of the first user at the time of detection of the predetermined action to be superimposed and displayed on the content.

(6)
The information processing device according to the above (2), in which the display control for lowering an immersion degree includes reducing a display size of the content in the display unit.

(7)
The information processing device according to the above (2), in which the content is a moving image, and
the display control for lowering an immersion degree includes causing a plurality of frame images extracted from a portion of the content after a current reproduction timing to be superimposed and displayed on the content.

(8)
The information processing device according to the above (7), in which the display control for lowering an immersion degree includes causing the plurality of frame images to be superimposed and displayed on the content in a predetermined region in the content.

(9)
The information processing device according to the above (8), in which the display control for lowering an immersion degree includes causing a guide display for guiding a sight line of the first user to be displayed so that the predetermined region in the content is displayed on the display unit and causing the plurality of frame images to be superimposed and displayed on the content when it is detected that the sight line of the first user has moved according to the guide display.

(10)
The information processing device according to the above (2), in which the predetermined action is an utterance, and when it is detected that the first user has uttered, the output control unit causes a predetermined character string to be superimposed and displayed on the content.

(11)
The information processing device according to the above (10), in which the output control unit causes the predetermined character string to be displayed in the vicinity of a gaze point of the first user in the content or at approximately the center of the display unit.

(12)
The information processing device according to the above (11), in which in a case where it is detected that the first user has uttered and a voice recognition result of the detected utterance includes an interjection, the output control unit causes a character string according to the voice recognition result of the utterance to be superimposed and displayed as the predetermined character string on the content.

(13)
The information processing device according to any one of the above (2) to (12), in which the output control unit starts the display control for lowering an immersion degree at a reproduction timing at which the excitement degree indicated by the excitement information changes from a degree equal to or less than the first threshold value to a degree larger than the first threshold value.

(14)
The information processing device according to above (2) to (13), in which the content includes at least one piece of event information, and
the output control unit starts the display control for lowering an immersion degree immediately before an event indicated by event information associated with an excitement degree larger than the first threshold value among the at least one piece of event information occurs.

(15)
The information processing device according to above (2) to (14), in which the output control unit further performs the display control for lowering an immersion degree on the basis of attribute information of the first user.

(16)
The information processing device according to above (2) to (15), in which the output control unit further performs the display control for lowering an immersion degree on the basis of a use time zone of the content.

(17)
The information processing device according to above (2) to (16), in which the excitement information indicates an excitement degree when the first user or a second user different from the first user has used the content in the past.

(18)
The information processing device according to above (2) to (16), in which the excitement information indicates a current excitement degree of the first user.

(19)

An information processing method including:
acquiring excitement information regarding use of a virtual reality content or information regarding an action of a first user who is using the content; and
performing display control for lowering an immersion degree of the first user by a processor on the basis of the excitement information or the information regarding the action of the first user during a period in which the content is displayed by a display unit.

(20)

A program for causing a computer to function as:
an acquisition unit that acquires excitement information regarding use of a virtual reality content or information regarding an action of a first user who is using the content; and
an output control unit that performs display control for lowering an immersion degree of the first user on the basis of the excitement information or the information regarding the action of the first user during a period in which the content is displayed by a display unit.

REFERENCE SIGNS LIST 10-1, 10-2 Server
20 Client terminal
22 Communication network
100, 200 Control unit
102 Information acquisition unit
104 Excitement information registration unit
106 Output control unit
120, 220 Communication unit
122, 230 Storage unit
124 Excitement information DB
126 Immersion degree reduction character string DB
222 Input unit
224 Display unit
226 Voice output unit
228 Sensor unit

The invention claimed is:

1. An information processing device, comprising:
a display screen;
a memory configured to store computer-executable instructions;
a processor configured to execute the computer-executable instructions:
acquire at least one of excitement information of a first user based on a virtual reality content or action information of the first user, wherein the virtual reality content is viewable by the first user on the display screen;
determine an excitement degree indicated by the excitement information of the first user;
determine a reproduction timing of the virtual reality content at which at least one of the excitement degree changes with respect to a first threshold value or the action information indicates a determined action of the first user; and
control the display screen to lower an immersion degree of the first user based on the reproduction timing at which at least one the excitement degree changes with respect to the first threshold value or the action information indicates the determined action of the first user.

2. The information processing device according to claim 1, wherein the processor is further configured to control the display screen to lower the immersion degree based on detection of the determined action of the first user during a period in which the virtual reality content is displayed.

3. The information processing device according to claim 2, wherein
the determined action is an action in which a steepness degree of motion of the first user is equal to or more than a second threshold value,
the action information regarding the determined action of the first user includes motion information of the first user, and
the processor is further configured to control the display screen to cause an animation, in which a virtual object corresponding to the first user moves according to the motion information of the first user at a time of the detection of the determined action, to be superimposed and displayed on the virtual reality content.

4. The information processing device according to claim 2, wherein
the determined action is an utterance, and
the processor is further configured to cause a determined character string to be superimposed and displayed on the virtual reality content based on detection of the utterance of the first user.

5. The information processing device according to claim 4, wherein the processor is further configured to cause the determined character string to be displayed in one of a vicinity of a gaze point of the first user in the virtual reality content or at a center of the display screen.

6. The information processing device according to claim 5, wherein the processor is configured to:
detect an interjection of the first user based on voice recognition of the detected utterance; and
cause a character string based on the voice recognition of the utterance to be superimposed and displayed as the determined character string on the virtual reality content.

7. The information processing device according to claim 2, wherein the processor is further configured to lower the immersion degree at the reproduction timing at which the excitement degree indicated by the excitement information changes from a first degree equal to or less than the first threshold value to a second degree larger than the first threshold value.

8. The information processing device according to claim 1, wherein the processor is further configured to control the display screen to move a position of a viewpoint in the virtual reality content backward with respect to a direction of the viewpoint to lower the immersion degree.

9. The information processing device according to claim 8, wherein the processor is further configured to control the display screen to cause an image of a back surface of the first user to be superimposed and displayed on the virtual reality content in a vicinity of the position of the viewpoint.

10. The information processing device according to claim 1, wherein the processor is further configured to control the display screen to reduce a display size of the virtual reality content on the display screen to lower the immersion degree.

11. The information processing device according to claim 1, wherein the processor is further configured to control the display screen to cause a plurality of frame images extracted from a portion of the virtual reality content after the reproduction timing to be superimposed and displayed on the virtual reality content.

12. The information processing device according to claim 11, wherein the processor is further configured to control the display screen to cause the plurality of frame images to be superimposed and displayed on the virtual reality content at a determined region in the virtual reality content.

13. The information processing device according to claim 12, wherein,
the processor is further configured to control the display screen to:
cause a guide display to guide a sight line of the first user to be displayed so that the determined region in the virtual reality content is displayed on the display screen; and
cause the plurality of frame images to be superimposed and displayed on the virtual reality content based on detection that the sight line of the first user has moved according to the guide display.

14. The information processing device according to claim 1, wherein
the virtual reality content includes at least one piece of event information, and
the processor is further configured to control the display screen to lower the immersion degree before an occurrence of an event indicated by the event information, wherein the event is associated with the excitement degree larger than the first threshold value.

15. The information processing device according to claim 1, wherein the processor is further configured to control the display screen to lower the immersion degree based on attribute information of the first user.

16. The information processing device according to claim 1, wherein the processor is further configured to control the display screen the immersion degree based on a use time zone of the virtual reality content.

17. The information processing device according to claim 1, wherein the excitement information includes the excitement degree of the first user based on usage of the virtual reality content by at least one of the first user or a second user different from the first user in a past.

18. The information processing device according to claim 1, wherein the excitement information indicates a current excitement degree of the first user.

19. An information processing method, comprising:
acquiring, by a processor, at least one of excitement information of a first user based on a virtual reality content or action information of the first user, wherein the virtual reality content is viewable by the first user on a display screen;
determining, by the processor, an excitement degree indicated by the excitement information of the first user;
determining, by the processor, a reproduction timing of the virtual reality content at which at least one of the excitement degree changes with respect to a first threshold value or the action information indicates a determined action of the first user; and
controlling, by the processor, the display screen to lower an immersion degree of the first user based on the reproduction timing at which at least one the excitement degree changes with respect to the first threshold value or the action information indicates the determined action of the first user.

20. A non-transitory computer-readable medium having stored thereon computer-executable instructions, which when executed by a processor of an information processing apparatus, cause the processor to execute operations, the operations comprising:
acquiring at least one of excitement information of a first user based on a virtual reality content or action information of the first user, wherein the virtual reality content is viewable by the first user on a display screen;
determining an excitement degree indicated by the excitement information of the first user;
determining a reproduction timing of the virtual reality content at which at least one of the excitement degree changes with respect to a first threshold value or the action information indicates a determined action of the first user; and
controlling the display screen to lower an immersion degree of the first user based on the reproduction timing at which at least one the excitement degree changes with respect to the first threshold value or the action information indicates the determined action of the first user.

* * * * *